US012718555B2

(12) United States Patent
Saxena et al.

(10) Patent No.: US 12,718,555 B2
(45) **Date of Patent: *Aug. 25, 2026**

(54) SYSTEM AND METHOD OF INTELLIGENT VEGETATION MANAGEMENT

(71) Applicant: AIDash, Inc, Palo Alto, CA (US)

(72) Inventors: Rahul Saxena, Santa Clara, CA (US); Nitin Das, Gurugram (IN); Abhishek Vinod Singh, Santa Clara, CA (US)

(73) Assignee: AIDash Inc, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/793,333

(22) Filed: Aug. 2, 2024

(65) Prior Publication Data

US 2024/0395032 A1 Nov. 28, 2024

Related U.S. Application Data

(63) Continuation of application No. 18/499,123, filed on Oct. 31, 2023, now Pat. No. 12,380,694, which is a (Continued)

(51) Int. Cl.
*G06V 20/10* (2022.01)
*G06F 18/2431* (2023.01)
(Continued)

(52) U.S. Cl.
CPC ........ *G06V 20/176* (2022.01); *G06F 18/2431* (2023.01); *G06N 3/04* (2013.01); (Continued)

(58) Field of Classification Search
CPC .. G06V 20/176; G06V 10/454; G06V 10/764; G06V 10/82; G06V 20/188;
(Continued)

(56) References Cited

U.S. PATENT DOCUMENTS 8,352,410 B2 1/2013 Rousselle et al.
10,460,169 B1 10/2019 Adler
(Continued)

OTHER PUBLICATIONS

Canadian Patent Application No. 3168831, Examination Report dated Aug. 28, 2023, 3 pages.
(Continued)

*Primary Examiner* — Jianxun Yang
(74) *Attorney, Agent, or Firm* — Ahmann Kloke LLP

(57) ABSTRACT

A method comprising receiving a first set of aerial images of a geographic area, receiving locations of assets, determining a likely location of at least one asset within each image, creating one or more bounding boxes, encompassing the likely location of one or more assets within each of the images, providing any number of the images to a convolutional neural network to classify pixels, the classification of each of the pixels indicating if the pixels are part of one or more obstructions or are part of a different classification, determining at least one zone, the zone encompassing the at least one asset, determining a distance between at least one pixel part of an obstruction and the zone, generating a criticality score based on the distance, comparing the criticality score to a threshold, and providing an alert of a future hazardous condition based on the criticality score.

20 Claims, 23 Drawing Sheets

Related U.S. Application Data continuation of application No. 17/160,231, filed on Jan. 27, 2021, now Pat. No. 11,842,538.

(60) Provisional application No. 62/966,531, filed on Jan. 27, 2020.

(51) Int. Cl.

| | |
|---|---|
| ***G06N 3/04*** | (2023.01) |
| ***G06V 10/44*** | (2022.01) |
| ***G06V 10/764*** | (2022.01) |
| ***G06V 10/82*** | (2022.01) |
| ***G08B 21/18*** | (2006.01) |
| ***H04L 67/53*** | (2022.01) |

(52) U.S. Cl.

CPC .......... *G06V 10/454* (2022.01); *G06V 10/764* (2022.01); *G06V 10/82* (2022.01); *G06V 20/188* (2022.01); *G08B 21/182* (2013.01); *H04L 67/53* (2022.05)

(58) Field of Classification Search

CPC ...... G06F 18/2431; G06N 3/04; G06N 3/045; G06N 3/08; G08B 21/182; G08B 31/00; H04L 67/53; H04L 67/52; H04L 67/60

See application file for complete search history.

(56) References Cited

U.S. PATENT DOCUMENTS

| | | | | |
|---|---|---|---|---|
| 11,144,758 | B2 | 10/2021 | Lavi | |
| 11,308,714 | B1 | 4/2022 | Christoudias et al. | |
| 11,842,538 | B2 | 12/2023 | Saxena et al. | |
| 2008/0105045 | A1 | 5/2008 | Woro | |
| 2009/0304236 | A1 | 12/2009 | Francini et al. | |
| 2012/0169498 | A1* | 7/2012 | Leppanen | G06V 20/188 702/2 |
| 2018/0218214 | A1 | 8/2018 | Pestun et al. | |
| 2018/0260626 | A1 | 9/2018 | Pestun et al. | |
| 2018/0336460 | A1 | 11/2018 | Tschemezki et al. | |
| 2019/0098687 | A1 | 3/2019 | Backholm et al. | |
| 2019/0129039 | A1 | 5/2019 | Schubert et al. | |
| 2019/0155973 | A1 | 5/2019 | Morczinek et al. | |
| 2019/0197134 | A1 | 6/2019 | Reyes Martinez et al. | |
| 2020/0075168 | A1* | 3/2020 | Frank | G16H 50/50 |
| 2020/0250424 | A1 | 8/2020 | Klein et al. | |
| 2021/0073692 | A1 | 3/2021 | Saha et al. | |
| 2021/0097850 | A1* | 4/2021 | Ton-That | G06F 16/587 |
| 2021/0118117 | A1 | 4/2021 | Albrecht et al. | |
| 2021/0142559 | A1 | 5/2021 | Yousefhussien et al. | |
| 2021/0232818 | A1 | 7/2021 | Saxena et al. | |
| 2022/0180016 | A1 | 6/2022 | Jenks et al. | |
| 2022/0414362 | A1 | 12/2022 | Lautala et al. | |
| 2023/0386199 | A1 | 11/2023 | Klein et al. | |
| 2024/0071073 | A1 | 2/2024 | Rajora et al. | |
| 2024/0330027 | A1 | 10/2024 | Zeng et al. | |

OTHER PUBLICATIONS

European Patent Application No. 21747885.8, Extended European Search Report dated Dec. 12, 2023, 9 pages.

Zhentian, Jiao, et al., "A Deep Learning Based Forest Fire Detection Approach Using UAV and YOLOv3", 2019 1st International Conference on Industrial Artificial Intelligence (IAI) IEEE, Jul. 23, 2019 (Jul. 23, 2019), pp. 1-5, XP033621505, DOI: 10.1109/ICIAI.2019.8850815.

International Application No. PCT/US2023/031302, International Search Report and the Written Opinion, dated Nov. 30, 2023, 13 pages.

UP42, "Stereo imagery, DSM, and machine learning for vegetation management," [retrieved online from https://up42.com/blog/tech/stereo-imagery-dsm-and-machine-learning-for-vegetation-management on Jan. 19, 2023].

Abdollahnejad, Azadeh, and Dimitrios Panagiotidis. "Tree Species Classification and Health Status Assessment for a Mixed Broadleaf-Conifer Forest with UAS Multispectral Imaging." Remote Sensing 12.22 (2020): 3722. (Year: 2020).

Bastani, F. et al., Satlaspretrain: A Large-Scale Dataset for Remote Sensing Image Understanding, https://arxiv.org/abs/2211.15660.

Byer, S., and Jin, Y., Detecting drought-induced tree mortality in sierra nevada forests with time series of satellite data, Remote Sensing, Sep. 2017, vol. 9. doi: 10.3390/rs9090929.

Cheng, Y., et al., Scattered tree death contributes to substantial forest loss in California, Nature Communications, Jan. 2024, vol. 15. DOI: 10.1038/s41467-024-44991-z.

Garrity, S.R., et al., Quantifying tree mortality in a mixed species woodland using multitemporal high spatial resolution satellite imagery, Remote Sensing of Environment, Feb. 2013, vol. 129, pp. 54-65, 2013.

Hutter, F. et al., An Efficient Approach for Assessing Hyperparameter Importance, Proceedings of the 31st International Conference on Machine Learning, Jun. 2014, pp. 754-762, vol. 32, PMLR, Beijing, China.

Liu, X., et al., Mapping standing dead trees in temperate montane forests using a pixel-and object-based image fusion method and stereo worldview-3 imagery, Ecological Indicators, Dec. 2021, article 108438, vol. 133. <https://doi.org/10.1016/j.ecolind.2021.108438>.

Oquab, M. et al., Dinov2: Learning Robust Visual Features Without Supervision, arXiv preprint arXiv:2304.07193, 2023.

Paszke, A. et al., Enet: A Deep Neural Network Architecture for Real-Time Semantic Segmentation, 2016. < https://arxiv.org/abs/1606.02147>.

Prakash, Pranav & Saxena, Ankur, Hazard Tree Instance Detection via Deep Neural Network Models, IGARSS, Aug. 2025, pp. 3709-3713, DOI: 10.1109/IGARSS55030.2025.11243161.

Xu, C. et al., Detecting Tiny Objects in Aerial Images: A Normalized Wasserstein Distance and a New Benchmark, ISPRS Journal of Photogrammetry and Remote Sensing, Jun. 2022, pp. 79-93, vol. 190. <https://arxiv.org/abs/2206.13996v1>.

Yarak, Kanitta, et al. "Oil palm tree detection and health classification on high-resolution imagery using deep learning." Agriculture 11.2 (2021 ): 183. (Year: 2021).

European Patent application No. 23861152.9, Extended European Search Report dated Jul. 8, 2026, 10 pages.

Herrero-Huerta, Mónica et al., Dense Canopy Height Model from a low-cost photogrammetric platform and LIDAR data, Trees Berlin, Feb. 25, 2016, p. 1287-1301, vol. 30, No. 4, ISSN: 0931-1890, DOI: 10.1007/S00468-016-1366-9.

Mills, Steven J. et al., Evaluation of Aerial Remote Sensing Techniques for Vegetation Management in Power-Line Corridors, IEEE Transactions On Geoscience and Remote Sensing IEEE, Sep. 1, 2010, pp. 3379-3390, vol. 48, No. 9, USA, XP011309408, ISSN: 0196-2892, DOI: 10.1109/TGRS.2010.2046905.

* cited by examiner

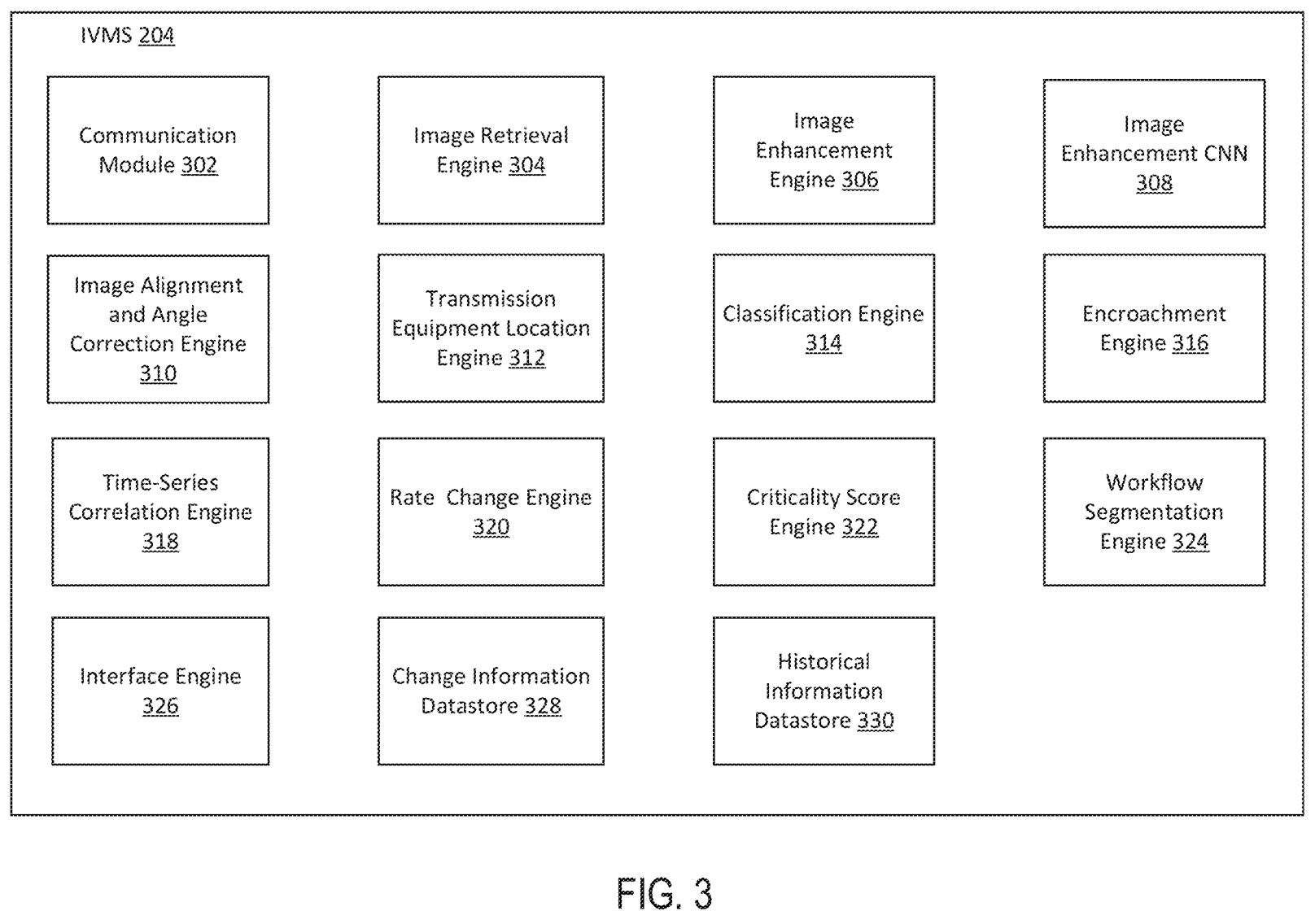

IVMS 204

Communication Module 302

Image Retrieval Engine 304

Image Enhancement Engine 306

Image Enhancement CNN 308

Image Alignment and Angle Correction Engine 310

Transmission Equipment Location Engine 312

Classification Engine 314

Encroachment Engine 316

Time-Series Correlation Engine 318

Rate Change Engine 320

Criticality Score Engine 322

Workflow Segmentation Engine 324

Interface Engine 326

Change Information Datastore 328

Historical Information Datastore 330

FIG. 3

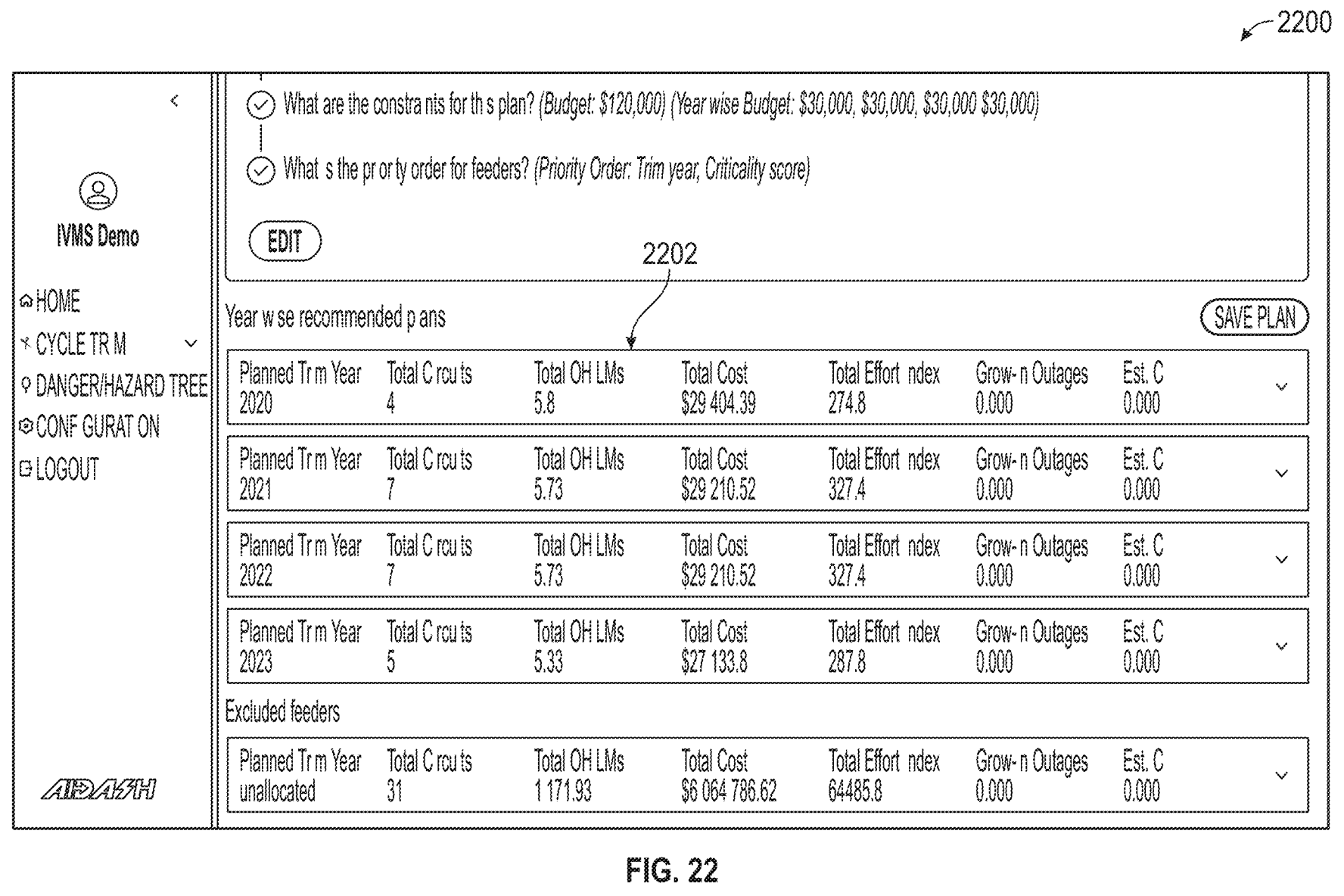

| Planned Tr m Year | Total C rcu ts | Total OH LMs | Total Cost | Total Effort ndex | Grow- n Outages | Est. C |
|---|---|---|---|---|---|---|
| 2020 | 4 | 5.8 | $29 404.39 | 274.8 | 0.000 | 0.000 |
| 2021 | 7 | 5.73 | $29 210.52 | 327.4 | 0.000 | 0.000 |
| 2022 | 7 | 5.73 | $29 210.52 | 327.4 | 0.000 | 0.000 |
| 2023 | 5 | 5.33 | $27 133.8 | 287.8 | 0.000 | 0.000 |

Excluded feeders

| Planned Tr m Year | Total C rcu ts | Total OH LMs | Total Cost | Total Effort ndex | Grow- n Outages | Est. C |
|---|---|---|---|---|---|---|
| unallocated | 31 | 1 171.93 | $6 064 786.62 | 64485.8 | 0.000 | 0.000 |

FIG. 22

SYSTEM AND METHOD OF INTELLIGENT VEGETATION MANAGEMENT

CROSS-REFERENCE TO RELATED APPLICATIONS

This application is a continuation of and seeks the benefit of U.S. Nonprovisional patent application Ser. No. 18/499,123, filed on Oct. 31, 2023 and entitled, "System and Method of Intelligent Vegetation Management," which is a continuation of and seeks the benefit of U.S. Nonprovisional patent application Ser. No. 17/160,231, filed on Jan. 27, 2021 and entitled, "System and Method of Intelligent Vegetation Management," now U.S. Pat. No. 11,842,538, which claims priority to and seeks the benefit of U.S. Provisional Patent Application No. 62/966,531, filed on Jan. 27, 2020 and entitled "Right of Way (ROW) Vegetation Management using AI System", which is incorporated in its entirety herein by reference.

FIELD OF THE INVENTION

Embodiments of the present inventions are generally related to assessing and monitoring vegetation in and around utility transmission equipment.

BACKGROUND

Vegetation management has always been a challenging task for utilities. Over the years, large-scale power outages, extreme weather events, wildfires, natural disasters, and other vegetation-related hazards have increased, thereby multiplying pressure on utilities, increasing costs, and affecting system reliability.

Wildfires are a major concern for power utilizes in the United States (U.S.) and other countries around the world. Over the past 10 years, there was an average of 62,000 wildfires per year and an average of 7.5 million acres impacted annually. One of the deadliest wildfires in California history, the Camp Fire, which burned more than 150,000 acres and destroyed 18,000 structures, was caused by faulty power lines, which may spark files on dry vegetation.

Vegetation management may help reduce the risk of wildfires by identifying overgrown trees that require trimming because they are growing too close to utility transmission equipment such as power lines or utility poles. Overgrown trees may short circuit power lines and cause power outages. Wind may blow trees and debris into power lines or break utility poles and cause power outages or wildfires. Vegetation management may also identify dead trees or areas of dry grass which require removal to reduce the risk of damage to the electrical network and cause wildfires.

Current methods of vegetation management include sending utility workers to survey the growth of trees and other vegetation in a particular area. The survey may be used to assess the risk of power outages or wildfires caused by overgrown trees or high winds. These solutions may be inefficient and time-consuming, particularly in view of the fact that power lines are geographically dispersed across the U.S. There are an estimated 5.5 million miles of local distribution lines, and 200,000 miles of high-voltage transmission lines in the U.S. Local distribution lines carry electricity from power substations to residential and commercial buildings, while high-voltage transmission lines between substations and power plants.

Fires caused by vegetation interacting with equipment have been an increasing hazard. For example, the North Complex Fire of Northern California endangered the twon of Paradise and surrounding communities. The fire, which was caused by vegetation obstructing electrical assets that were difficult to manually access, burned almost 320,000 acres before being contained.

SUMMARY

An example system comprises at least one processor and memory. The memory may contain instructions to control any number of the at least one processor to: receive a first set of aerial images of a geographic area, the geographic area including assets of an infrastructure, the infrastructure including the assets distributed over a geographic region, the first set of aerial images being received from a first image source over a communication network, receive location information regarding a location of the assets, the first set of aerial images being taken during a first duration of time, determine a likely location of at least one asset within each image of the first set of aerial images based on the location information, create one or more bounding boxes within each of the images of the first set of aerial images, the one or more bounding boxes within each of the images of the first set of aerial images encompassing the likely location of one or more assets within a particular image of the first set of aerial images, provide any number of the images of the first set of aerial images to a convolutional neural network to classify pixels within the one or more bounding boxes, a classification of each of the pixels indicating if the pixels are part of one or more obstructions depicted in the any number of the images of the first set of aerial images or are part of a different classification, determine at least one zone within at least one of the any number of the images, the zone encompassing the at least one asset depicted in the at least one of the any number of the images, determine a first distance between at least one pixel that is part of the one or more obstructions within at least one of the bounding boxes and the at least one zone, generate a criticality score based on the first distance, compare the criticality score to a threshold, and provide an alert of a future hazardous condition based on the comparison of the criticality score and the threshold.

The aerial images may be taken during a first duration of time are satellite images taken in a particular month of a particular year. The location information may be provided by third-party over the communication network. The third-party may manage the assets. The third-party may be remote and separate from the first image source. The location information may include coordinates of the assets.

In various embodiments, memory contains instructions to control the any number of the at least one processor to further correlate the location information with metadata associated with the one or more images of the aerial images to determine the likely location of the at least on asset within the each image of the first set of aerial images, the metadata including coordinates of at least some of the geographic area.

Determining the at least one zone may include determining a first zone of the at least one zone based on one or more possible hazardous conditions that may be caused by the one or more obstructions on the at least one asset. Determining the first zone may include determining a width of the at least one zone based on the one or more possible hazardous conditions. The one or more possible hazardous conditions may be weighted based on terrain type of the geographic area, weather patterns, and accessibility of the geographic area. The one or more possible hazardous conditions may be weighted based on risk of wildfire.

In some embodiments, the memory contains instructions to control the any number of the at least one processor to further: receive a second set of aerial images of the geographic area, the second set of aerial images having been captured during a second duration of time, the second duration of time being one year or more from the first duration of time, create one or more bounding boxes within each of the images of the second set of aerial images, the one or more bounding boxes within each of the images of the second set of aerial images encompassing the likely location of one or more assets within the particular image of the second set of aerial images, provide any number of the images of the second set of aerial images to the convolutional neural network to classify pixels within the one or more bounding boxes within each of the images of the second set of aerial images, the classification of each of the pixels indicating if the pixels are part of one or more obstructions depicted in the any number of the images of the second set of aerial images or are part of the different classification, determine a second distance between at least one pixel that is part of the one or more obstructions within at least one of the bounding boxes within each of the images of the second set of aerial images and the at least one zone, determine a rate of change between the first distance and the second distance, determine a future impact based on the rate of change to the asset, generate a second criticality score based on the future impact, and provide an alert of the future hazardous condition based on the second criticality score.

The convolutional neural network may be a u-net convolutional neural network.

An example method may include receiving a first set of aerial images of a geographic area, the geographic area including assets of an infrastructure, the infrastructure including the assets distributed over a geographic region, the images being received from a first image source over a communication network, receiving location information regarding a location of the assets, the first set of aerial images being taken during a first duration of time, determining a likely location of at least one asset within each image of the first set of aerial images based on the location information, creating one or more bounding boxes within each of the images of the first set of aerial images, the one or more bounding boxes encompassing the likely location of one or more assets within a particular image of the first set of aerial images, providing any number of the images of the first set of aerial images to a convolutional neural network to classify pixels within the one or more bounding boxes, a classification of each of the pixels indicating if the pixels are part of one or more obstructions depicted in the any number of the images of the first set of aerial images or are part of a different classification, determining at least one zone within at least one of the any number of the images, the zone encompassing the at least one asset depicted in the at least one of the any number of the images, determining a distance between at least one pixel that is part of the one or more obstructions within at least one of the bounding boxes and the at least one zone, generating a criticality score based on the distance, comparing the criticality score to a threshold, and providing an alert of a future hazardous condition based on the comparison of the criticality score and the threshold.

An example non-transitive computer readable medium may comprise instructions to control at least one processor to perform a method. The method may comprise receiving a first set of aerial images of a geographic area, the geographic area including assets of an infrastructure, the infrastructure including the assets distributed over a geographic region, the images being received from a first image source over a communication network, receiving location information regarding a location of the assets, the first set of aerial images being taken during a first duration of time, determining a likely location of at least one asset within each image of the first set of aerial images based on the location information, creating one or more bounding boxes within each of the images of the first set of aerial images, the one or more bounding boxes encompassing the likely location of one or more assets within a particular image of the first set of aerial images, providing any number of the images of the first set of aerial images to a convolutional neural network to classify pixels within the one or more bounding boxes, a classification of each of the pixels indicating if the pixels are part of one or more obstructions depicted in the any number of the images of the first set of aerial images or are part of a different classification, determining at least one zone within at least one of the any number of the images, the zone encompassing the at least one asset depicted in the at least one of the any number of the images, determining a distance between at least one pixel that is part of the one or more obstructions within at least one of the bounding boxes and the at least one zone, generating a criticality score based on the distance, comparing the criticality score to a threshold, and providing an alert of a future hazardous condition based on the comparison of the criticality score and the threshold.

BRIEF DESCRIPTION OF THE DRAWINGS

FIG. 3 depicts a block diagram of an example Intelligent Vegetation Management System (IVMS) according to some embodiments.

FIG. 22 is an example user interface depicting year-wise recommended plans according to some embodiments.

DETAILED DESCRIPTION

Figure 1B:
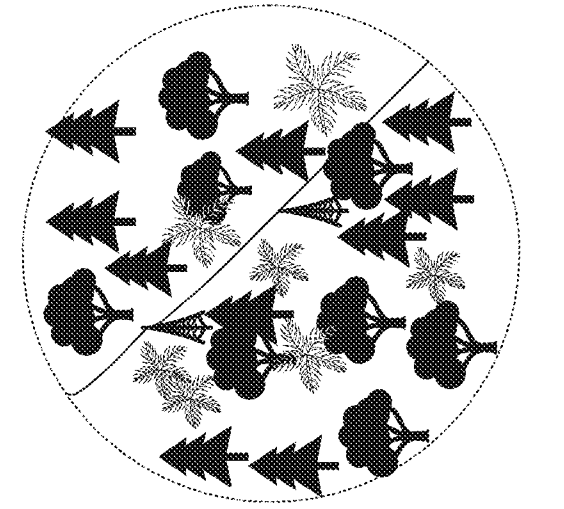
FIG. 1B depicts an example of the images that may be taken by aircraft, drones, and/or satellites.

An intelligent vegetation management system (IVMS) may remotely monitor and survey an entire network using high-resolution multispectral satellite imagery and/or ground data to effectively plan trim cycle, hazard tree management. The IVMS system may assist in monitoring conditions that may impact service, create a risk to electrical equipment, and/or cause fires. In various embodiments, the intelligent vegetation management system may collect images from satellite images, drones, airplanes, and the like over hundreds of miles of transmission lines over difficult to reach terrain. By using the images, the intelligent vegetation management system may analyze the images to identify encroachment of vegetation at and around transmission lines, poles, and electrical equipment. The intelligent vegetation management system may further identify growth rates and/or rates of change of vegetation to make predictions for safe trim cycle management, reduction of risk of fires, and the safety of the community.

The IVMS system may combine imagery, such as satellite imagery, with artificial intelligence to objectively identify vegetation risk and reliability. As a result, customers, such as commercial utilities, vegetation management companies, insurance companies, and government, can assess risk, prioritize tasks and spend dollars wisely.

The IVMS system may also make predictions based on changes over time. For example, the IVMS system may receive satellite imagery of the same area over several years. Based on this information, the IVMS system may make accurate predictions of rates of change. By using images over time, the IVMS systems may make reliable predictions of actual growth conditions rather than predicted growth conditions. For example, some species of trees may typically grow very quickly, but conditions within a particular geographic area may be unsuitable for growth and/or weather patterns may be suboptimal which may slow growth. By examining actual conditions, the IVMS systems may make more accurate predictions. Further, the IVMS system may make predictions on changes that occur over time such as ground movement, dead tree debris, and the like that other systems may be unable to account.

In some embodiments, the IVMS may detect clearance, dimensions, species, and geo-location of vegetation growing alongside the Right of Way of T&D networks. The system may also calculate the impact of not clearing vegetation hazards and the probability score of potential disruptions, thus allowing ground operators to work in a prioritized and intelligent manner.

Vegetation is often managed through manual inspection by personnel physically visiting the geographic area where the electrical assets are located. Given that there are hundreds of miles of distribution lines and electrical equipment, it is not practical to physically visit many sites very often. As such, vegetation management companies and utilities are unaware of conditions or make guesses based on one or more visits that may be years if not decades old.

As discussed herein, the IVMS may use an A.I. model to improve the quality of the captured images to generate high-resolution images from low-resolution images. The IVMS may utilize current or up-to-date images and videos from the different sources to determine current clearances of vegetation, such as trees, around a particular area, such as in and around utility transmission equipment to determine if one or more geographic areas represented by the captured aerial and ground-level images requires trimming.

Figure 1A:
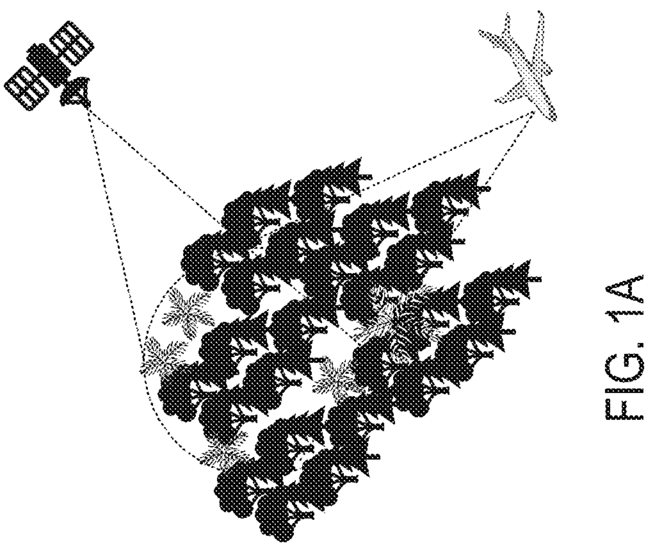
FIG. 1A depicts a geographic area where electrical network assets are located in some embodiments.

FIG. 1A depicts a geographic area where electrical network assets are located in some embodiments. The electrical network assets may not be visible from below given the terrain and vegetation. Images taken by aircraft, drones, and/or satellites, however, may reveal the location of the electrical assets such as the location of poles and transmission lines. FIG. 1B depicts an example of the images that may be taken by aircraft, drones, and/or satellites.

The images may be enhanced, oriented, and analyzed using training AI to identify vegetation encroachment (e.g., proximity of vegetation, debris, and/or obstacles) to electrical assets. Using this information, the IVMS may identify growth rates, rates of change, threats to electrical assets, risk of causing fires, risks caused by weather phenomena (e.g., wind, lightning), risk caused by fires, and/or natural disasters.

In some embodiments, the IVMS may obtain historical images from a particular area and utilize a geospatially-based algorithm to align the different images of the same general area captured during different periods of time and correct for different image capture angles, which may distort one or more objects in the geographic area represented by the captured image. The IVMS may provide the corrected historical images into a machine learning (ML) model to estimate the growth rate of trees in a particular area. The IVMS may generate criticality scores based on the estimated growth rate, and based on the criticality score, generate a vegetation trimming schedule, provide alerts, and/or other recommendations.

The IVMS may include a user interface (U.I.) that may provide to a user of the IVMS an estimate encroachment around zones of utility transmission equipment. In some embodiments, the U.I. may provide a report indicating criticality scores of vegetation in the particular area and provide alerts to the user based on the criticality scores. Furthermore, the U.I. may allow the user of the IVMS to send one or more work orders corresponding to geographic locations that require vegetation trimming based on the provided report or alerts.

Figure 2:
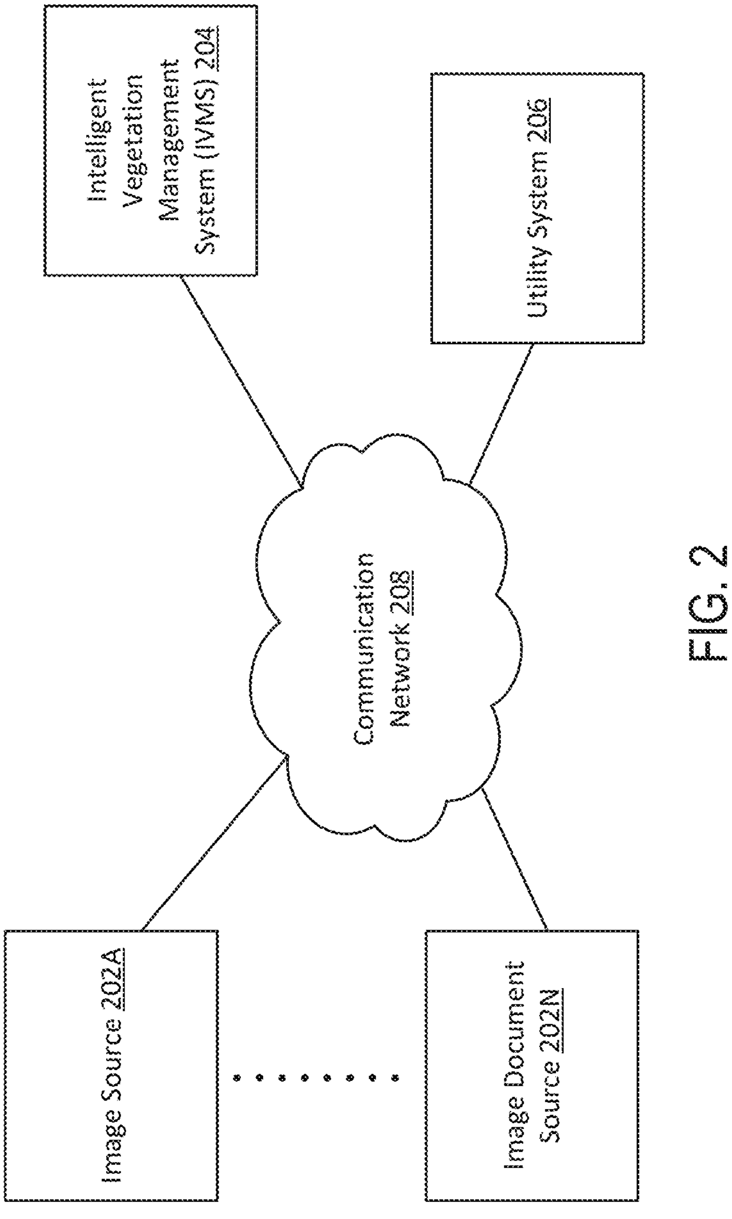
FIG. 2 depicts an example environment capable of assessing and monitoring vegetation according to some embodiments.

FIG. 2 depicts an example environment 200 capable of assessing and monitoring vegetation. In this example, the example environment 200 includes image sources 202A to 202N (individually, image source 202 collectively), a communication network 208, an intelligent vegetation management system (IVMS) 204, and a utility system 206. Each of the IVMS 204 and utility system 206 may be or include any number of digital devices. A digital device is any device with a processor and memory. Digital devices are further discussed herein (e.g., see FIG. 6).

Image sources 202A to 202N may each be a third-party system configured to provide aerial images or access to aerial images. Different third-parties (e.g., different image sources 202A-202N) may periodically capture aerial images of geographic regions. For example, some third-parties at regular intervals or on-demand may obtain images of geographic regions from satellites, airplanes, and/or drones for a variety of purposes. Different third-parties may obtain images from different sources (e.g., different airplanes, satellites, or the like) for the same and/or different geographic region. An example of a third-party includes Airbus Aerial. The third-parties may provide images and/or license access to the aerial images to other businesses for a variety of purposes.

In some embodiments, any number of the image sources 202A-N may obtain images of the same geographic area and save them over time. As such, an image source 202A may obtain and store images of a geographic site taken on different days, months, or years. For example, a first image source 202A may provide images at a first duration of time (e.g., taken at a particular time and date). The same image source 202A may also provide images at a second duration of time of the same geographic areas (e.g., taken at a different particular time or date such as one or more years before or after the first duration).

Any number of the image sources 202A-N may provide APIs to enable another business (e.g., IVMS 204) to request images for a particular geographic area (e.g., all or part of a geographic region). The request may be a request for current images and/or for images of the same geographic areas taken at different times. In various embodiments, the other business may request information on what geographic area images are available and at what time frames. A geographic area may be a subset of a geographic region. A geographic region is any portion on the surface of the Earth. In various embodiments described herein, a geographic region includes assets (e.g., electrical network assets).

The intelligent vegetation management system (IVMS) 204 may be configured to receive aerial images of any number of geographic areas. The IVMS may utilize the images to identify vegetation and/or other obstacles that may interfere with the operation of assets of a high-voltage distribution network (referred to herein as an electrical network). An asset of an electrical network may include, for example, transmission lines, distribution stations, feeder lines, circuit spans, segments, poles, transformers, substations, towers, switches, relays, and/or the like.

In various embodiments, the IVMS 204 may enhance, orient, and analyze (e.g., using artificial intelligence/machine learning systems) to identify vegetation encroachment (e.g., proximity of vegetation, debris, and/or obstacles) to assets of an electrical network. Using this information, the IVMS may identify existing threats to the electrical network, assets, and/or people caused by the vegetation encroachment. Further, in some embodiments, the IVMS 204 may utilize this information to determine growth rates, rates of change, threats to electrical assets, risk of causing fires, risks caused by weather phenomena (e.g., wind, lightning), the risk caused by fires, and/or natural disasters.

In some embodiments, the IVMS 204 may request current satellite images from companies such as Airbus Aerial and utilize the images to identify overgrown trees that require trimming. The IVMS 204 may request other satellite and/or airplane images for the same geographic areas, combine the images from different image sources for the same geographic areas and then analyze the information to identify threats and other information.

Utilizing satellite, airplane, and/or drone images provides a significant advantage over manual viewing from the ground. Satellite images are images of Earth collected by imaging satellites operated by governments and businesses. In addition to ease in obtaining the images, it will be appreciated that satellite images may have a spatial resolution of 30-centimeter (cm)×30 cm. The spatial resolution refers to the size of a geographic area on the Earth represented by one pixel of the satellite image, a 30 cm×30 cm spatial resolution means each pixel of the satellite image represents a 900 square centimeter area. In some embodiments, satellite images have a spatial resolution of 50 m×50 m. Due to cost constraints or satellite image availability, the IVMS 204 may receive images of the same area with different spatial resolutions.

In some embodiments, the IVMS 204 may utilize A.I., including a trained convolution neural network (CNN), to improve the quality of captured images using histogram modification, contrast enhancement, and bilinear interpolation to generate high-resolution images from low-resolution images. In some embodiments, image sources 202 includes satellite, drones, airplanes, and the like.

Satellite images may be captured using both a red-green-blue (RGB) band as well as an infrared (I.R.) band. By capturing satellite image using the RGB band and I.R. band, the IVMS 204 may generate a three-dimensional (3D) model of an area of the Earth and output the 3D model onto a user interface.

Due to the high cost of satellite imagery, which cost an average of $1 per square kilometer with a spatial resolution of 30 cm, images captured using other image capture forms may be considered. In some terrains, such as residential areas with a lot of mature trees obscuring transmission lines, a higher spatial resolution of 30 cm may be insufficient. The cost of satellite imagery may make this imagery solution too expensive and prohibitive. To obtain images of terrains with a spatial resolution of less than 30 cm may require other forms of image capture, such as drones. Drones have a limited flight time, and therefore, the area of the physical environment captured by drones may be less than that of a satellite.

Aerial images may also be captured using an airplane, sometimes referred to as aviation photography. Similar to satellite images, aerial images captured using airplanes may be licensed or captured on-demand by private companies. Aerial images may have a higher spatial resolution than satellite images and may provide another source of digital images for IVMS 204.

To account for the differences in image capture angles which result from different forms of image capture, such as satellite, airplanes, and drones, the IVMS 204 may input images of the same area captured by different methods of image capture. In some embodiments, the IVMS 204 may utilize images from different methods of image capture to correct for different image capture angles, enhance the information contained within the images, and add information for more accurate analysis. The IVMS 204 may utilize ML algorithms or models to correct the image capture angles, which may distort objects captured in the images.

In various embodiments, due to environmental factors such as cloud coverage, smoke, or fog, a satellite may require more than one fly over to capture satellite images or aviation photographic images of a particular area. The IVMS 204 may utilize A.I. to recognize features on each of the multiple images of the particular area. Similarly, the IVMS 204 may utilize a CNN to improve the quality of captured images by using contrast enhancement. In some embodiments, the IVMS 204 may receive satellite imagery of the same area over several years and use that information to estimate the growth of trees in that area and generate an estimate of a future schedule of tree trimming.

In various embodiments, the IVMS 204 may correlate utility equipment and/or transmission line location information with images captured using various forms of image capture to identify an estimated location of utility equipment or transmission lines. The IVMS 204 may receive this information from the utility system 206. In one embodiment, the IVMS 204 may determine the location of transmission lines or utility equipment using feature recognition of an A.I. model.

The IVMS 204 may determine any number of increasing zones around an asset. A zone is areas around the asset and may represent different degrees of obstruction or future encroachment. It will be appreciated that there may be different zones for different assets and for different geographic areas. An asset in a dense urban environment may have different zones than an asset in a rural community. Further assets that are hard to reach or are located in areas that could start an extremely dangerous wildfire (e.g., due to the dense, dry vegetation and difficulty in getting fire equipment in the area) may have much greater zones. In some embodiments, a primary zone around electrical equipment may be an area that must remain clear for the risk of fire or other dangers.

Zones can be established by a user, insurance provider, emergency responder, government agency, or the like. In various embodiments, the IVMS 204 may be configured with a set of rules establishing any number of concentric zones around an asset. Each zone may be based on the location of the asset, geographic area of the asset, the functionality of the asset, possible hazards that might be caused, the amount of damage associated with different hazards, and/or the like.

In some embodiments, if encroachment (e.g., caused by growing vegetation, a falling tree, debris, earth movement, or the like) on a zone of an asset is greater than a predetermined threshold, the IVMS 204 may generate an alert and provide the alert to a user of the utility system 206. In some embodiments, the IVMS 204 may include multiple zones, which corresponds to a level of criticality or urgency to remove the encroaching vegetation. The type of alert and the method of the notification may depend on the level of criticality or urgency.

In various embodiments, the IVMS 204 may compare vegetation information across a time-series of images of the same location. The time series of images may be a mixture of images captured using satellites, airplanes, and drones or a combination thereof. The IVMS 204 may compare vegetation information across the time-series of images of the same location to estimate a growth rate of a particular feature in the location. In some embodiments, the feature may be vegetation, such as trees.

In various embodiments, the IVMS 204 may identify encroachment zones around each utility equipment and/or transmission line and identify boundaries of the identified vegetation. The IVMS 204 may generate a criticality score of identified vegetation based on a distance between the identified vegetation and utility equipment and/or transmission lines (and/or distance between the identified vegetation and one or more encroachment zones around the utility equipment and/or transmission lines).

The IVMS 204 may provide, to an interface, a report indicating criticality scores. The criticality score report may be filtered and sorted according to parameters provided by a user. In some embodiments, the criticality score report may be displayed in the form of a chart, a graph, or map, with icons or pins indicating the location of one or more places of the utility equipment and/or transmission lines that require vegetation trimming. In some embodiments, the criticality score report may include suggestions of the type of equipment required for a work order, an estimated number of work-hours required, and a time-frame of when the work order needs to be completed before reaching an even higher criticality level.

In various embodiments, a utility system 206 may be responsible for the management, control, and or alerts regarding an electrical network. An electrical network is any network of transmission lines, including electrical assets for the generation, transmission, and distribution of electricity. An electrical asset is any component of the electrical network, including, for example, transmission lines, poles, transformers, substations, towers, switches, relays, and/or the like. In some embodiments, the utility system 206 may be a utility company that owns the utility equipment and/or transmission lines, such as the Pacific Gas and Electricity Company (PG&E). Although the example in FIG. 2 depicts a utility system 206, it will be appreciated that there may not be a utility system 206 but any other system that tracks or enables management of vegetation, debris, or other asset care.

Although electrical networks are specifically discussed herein, it will be appreciated that embodiments discussed herein may be applied to any infrastructure, including, for example, gas lines, pipelines, buildings, roads, highways, and/or the like.

In some embodiments, communication network 208 represents one or more computer networks (e.g., LANs, WANs, and/or the like). The communication network 208 may provide communication between any of the image source 202, the IVMS 204, and the utility system 206. In some implementations, the communication network 208 comprises computer devices, routers, cables, uses, and/or other network topologies. In some embodiments, the communication network 208 may be wired and/or wireless. In various embodiments, the communication network 208 may comprise the Internet, one or more networks that may be public, private, IP-based, non-IP based, and so forth.

FIG. 3 depicts a block diagram of an example IVMS 204 according to some embodiments. The IVMS 204 includes a communication module 302, an image retrieval engine 304, an image enhancement engine 306, an image enhancement convolution neural network (CNN) 308, an image alignment and angle correction engine 310, an asset location engine 312, a classification engine 314, an encroachment engine 316, a time series correlation engine 318, a rate change engine 320, a criticality score engine 322, a workflow segmentation engine 324, an interface engine 326, a change information datastore 328, and a historical information datastore 330.

The communication module 302 may send and receive requests or data between any of the image source 202, the IVMS 204, and the utility system 206. The communication module 302 may receive a request from a user of IVMS 204 (e.g., via an interface) to request images from the image source 202A. In some embodiments, the communication module 302 may provide an interface or information for a remote interface to enable a third party (e.g., a utility, vegetation management company, workers, supervisors, contractors, insurance companies, and/or the like) to view and manage vegetation trimming and safety activities.

In some embodiments, the image retrieval engine 304 may retrieve images or video from any number of multiple image sources 202. In one example, an image source 202 may provide aerial and/or ground-level images and video. The images or video may be captured by different devices, such as satellites, airplanes, drones, image capture devices, surveillance cameras, and the like. Commercially available satellite images from companies such as Airbus Aerial may provide a user interface or a web link to download satellite images of specific geographic areas.

In various embodiments, the image retrieval engine 304 may interact with one or more of the image sources 202 to retrieve different images of the same geographic area and/or different geographic areas. For example, the image retrieval engine 304 may retrieve one set of images taken by satellite (s) of a geographic area that is available through a first image source 202A and other images taken by an airplane of the same geographic area that is available through a second image source 202B.

In various embodiments, the image retrieval engine 304 may request images based on geographic area (e.g., coordinates), location information, date ranges, quality (e.g., high quality or based on resolution), enhancement, orientation, and/or the like.

In some embodiments, the image retrieval engine 304 may provide an Application Programming Interface (API) call to a software application that provides satellite images. In some embodiments, the image retrieval engine 304 may receive enhanced and aligned images from a satellite image source such as Google Maps.

In various embodiments, the image enhancement engine 306 may determine if images received from the image retrieval engine 304 require enhancement. In some embodiments, the image enhancement engine 306 may utilize computer vision techniques and deep learning models to determine if the quality of images received from the image retrieval engine 304 may be improved.

In some embodiments, the image enhancement engine 306 may scan any number of images, remove noise, remove undesired markings provided by the service, improve accuracy, balance or remove color, or the like.

In some embodiments, the spatial resolution of images captured by the different image sources 202 is different. The image enhancement engine 306 may utilize techniques such as histogram equalization, contrast enhancement, bilinear interpolation, or some combination thereof to generate high-resolution images from low-resolution images.

The image enhancement CNN engine 308 may utilize a CNN to assist with image enhancement of any number of images for any number of geographic areas. In various embodiments, the image enhancement CNN engine 308 utilizes a u-net architecture. For example, the image enhancement CNN engine 308 may utilize a u-net CNN to convert an image (e.g., feature map) to vector(s) for classification and then reconstruct an image from the vector. The same feature map used to convert the image to vector(s) may also be used to convert the vector(s) back into an image.

The u-net CNN for image enhancement may include three sections: a contraction section, a bottleneck section, and an expansion section. Each block of a section takes an input and applies convolution layers followed by a max pooling. The number of feature maps after each block may double so that the architecture can learn the structures. The bottleneck section mediates between the contraction layer and the expansion layer and may utilize CNN layers followed up an upsampling layer. Similar to the contraction layer, the expansion section includes several expansion blocks. Each block passes the input to two CNN layers followed by an upsampling layer. Every time the input gets appended by feature maps of the corresponding contraction layer. This action may ensure that the features that are learned while contracting the image will be used to reconstruct it. The number of expansion blocks is as same as the number of contraction blocks. The resultant mapping may pass through another CNN layer with the number of feature maps equal to the number of segments desired.

In various embodiments, the image enhancement CNN engine 308 utilizes a u-net CNN with trainable parameters 1, 301, 588, and a number of layers 133. The image enhancement CNN engine 308 may further utilize a mean square error as an objective function. It will be appreciated that the trainable parameters, number of layers, and objective function are examples and any number of parameters, number of layers, and objective function may be used.

The utilization of the u-net may allow for the enhancement of images in various embodiments. The output of the image enhancement CNN engine 308 may be an enhanced image.

The image alignment and angle correction engine 310 may align and/or correct the angle of any number of images. In one example, there may be a plurality of images of a geographic region (e.g., including any number of geographic areas). Different images of geographic areas in the same geographic region may be provided by different image sources 202A-N. Different image sources, however, may have different orientations of their images that may need correction in view of other images of the same geographic region and/or area. Further, although man image sources may indicate a particular orientation and angle, the images from that image source may be in variance to the stated orientation and/or angle. In some embodiments, different images from the same image source may be misaligned and/or at different angles from each other. In some embodiments, for example, images taken at one date may vary in alignment and angle from other images of the same area but taken by a different date (e.g., due to time images were taken, particular satellite, different satellites, different conditions, and/or the like).

In some embodiments, the image alignment and angle correction engine 310 uses a geospatially based algorithm to align the images captured by the different image sources

202. In some embodiments, the image alignment and angle correction engine 310 may use metadata associated with images provided by different image sources 202 to correct for image capture angle. For example, the image alignment and angle correction engine 310 may determine the altitude of the image capture device (based on the metadata provided by the providing image source 202A), a principal point, nadir, and isocenter for each image captured the image source 202A. The principal point is a point where a perpendicular projected through the center of the camera lens intersects the photo image. The nadir is a point vertically under the center of the camera at the time of exposure, while the isocenter is a point on the photograph that falls on a line halfway between the principal point and the nadir point.

In various embodiments, the image alignment and angle correction engine 310 corrects for distortion caused by lens distortion, tilt displacement, and topographic displacement. Lens distortion may be caused by flaws in the optical components of the image capture device. Tilt displacement occurs when the image capture device is tilted, and objects in the images captured by the tilted image capture device may be shifted from their position on the image when captured by an image capture device that is directed above the object—changes in the topography or the terrain of the physical environment.

In various embodiments, the asset location engine 312 may identify assets in any number of images. In some embodiments, the asset location engine 312 may request asset location information from a third-party or utility system 206. The third party or utility system 206 may provide coordinates for any number of assets, including locations of distribution lines, transmission lines, feeder lines, substations, poles, transformers, and the like. The asset location engine 312 may use the coordinates received from the third-party or utility system 206 to identify the location of assets in any number of images. For example, the asset location engine 312 may utilize coordinates from the third-party or utility system 206 and the coordinates provided by the image source 202 of images to identify likely locations of assets and/or the types of assets (e.g., poles, lines, and the like) (see FIG. 1B for example).

In various embodiments, the asset location engine 312 may utilize the coordinates from the metadata or asset locations recognized from any number of images. The asset location engine 312 may determine any number of zones about each asset. In one example, the asset location engine 312 may identify three zones around a particular asset. The closest zone (e.g., a circle or any shape of the terrain around an asset) may be critical to keep clear. A second zone around an asset (the second zone may circumvent the first zone) may indicate a zone that is best kept clear or indicates a degree of significance if vegetation, debris, or obstacles encroach the second zone. The third zone may circumvent the first and second zone or may indicate areas outside the second zone. There may be any number of zones.

In various embodiments, the asset location engine 312 may determine a width or location around an asset based on the location of the asset. For example, an asset such as an electrical pole that is located in an easily accessible location and in an area that is low in fire risk may have a smaller first zone (e.g., vegetation, debris, or obstacles) may be allowed to come closer to the asset than other assets. Another asset that is in inaccessible or difficult terrain but closer to a town in a forest prone to dry conditions may have a much larger first zone relative to the first zone of another asset.

The asset location engine 312 may classify geographic regions based on classifications provided by the utility. Some classifications may indicate terrain (e.g., urban, non-urban, grassland, forest, coastal), degree of risk (e.g., high risk of fire), proximity to emergency services, access to trimming or maintenance crews, and/or the like. Different classifications may be associated with the number of zones and breadth of each zone (e.g., a first and second zone of an asset in a high fire hazard area may be broader than a first and second zone of an asset in a low fire hazard area).

In some embodiments, the asset location engine 312 may include or utilize zone rules. A zone rule may determine the shape of each zone about a particular asset (or asset type) based on the classification of an asset (e.g., based on the classification as discussed above).

The classification engine 314 may classify pixels in any number of images from the image sources 202A-N. The pixels may be grouped, based on classification, into types of objects and vegetation. The IVMS 204 may determine the vegetation, obstacles, or debris in each image and the proximity of the vegetation, obstacles, or debris to any number of the zones. The IVMS 204 may calculate a criticality score using the distance between the boundaries of the vegetation, obstacles, or debris to any number of zones. Based on the criticality scores of particular assets or combinations of assets (e.g., spans, segments, or circuits), the IVMS 204 may provide indications and/or alerts for corrective action (e.g., cut back or move obstacles encroaching on any number of assets).

The classification engine 314 may classify pixels of an image using a second u-net CNN. In various embodiments, the classification engine 314 and/or the asset location engine 312 may identify bounding boxes in the location or approximate location of assets within each image (e.g., bounding boxes about the poles and lines that span the poles). The bounding boxes may be placed based on coordinates provided by a utility (or other third parties) and/or identification of the asset within the image.

The classification engine 314 may classify the pixels within the bounding boxes (e.g., and not the pixels outside the bounding boxes) using the u-net CNN. Bounding boxes may be used to assist in scaling and computational efficiency. In various embodiments, the bounding boxes may circumvent any number of assets or locations as well as locations of any number of zones about those assets.

The u-net CNN as utilized by the classification engine 314 may be similar in functionality as the u-net CNN utilized by the image enhancement CNN engine 308. As similarly discussed herein, the image enhancement CNN engine 308 may utilize a u-net CNN to convert an image (e.g., feature map) to vector(s) for classification and then reconstruct an image from the vector. The same feature map used to convert the image to vector(s) may also be used to convert the vector(s) back into an image.

The u-net CNN for pixel classification of pixels in the bounding boxes may include three sections: a contraction section, a bottleneck section, and an expansion section. Each block of a section takes an input and applies convolution layers followed by a max pooling. The number of feature maps after each block may double so that the architecture can learn the structures. The bottleneck section mediates between the contraction layer and the expansion layer and may utilize CNN layers followed by an upsampling layer. Similar to the contraction layer, the expansion section includes several expansion blocks. Each block passes the input to two CNN layers, followed by an upsampling layer. Every time the input gets appended by feature maps of the corresponding contraction layer. This action may ensure that the features that are learned while contracting the image will be used to reconstruct it. The number of expansion blocks is as same as the number of contraction blocks. The resultant mapping may pass through another CNN layer with the number of feature maps equal to the number of segments desired.

In various embodiments, the classification engine 314 utilizes a u-net CNN with trainable parameters 31, 099, 651, and a number of layers of 55. The image enhancement CNN engine 308 may further utilize weighted binary cross-entropy. It will be appreciated that there may be any number of trainable parameters, number of layers, and different functions.

The classification engine 314 may utilize k-means clustering to a group and classify pixels from the u-net CNN of the classification engine 314 into discrete groups. The groups, for example, may include trees, grass, shadow, and non-vegetation. There may be any number of groups. In various embodiments, the classification engine 314 utilizes k-means clustering to provide a segmented image having each pixel as classified in one of the categories.

The encroachment engine 316 may determine the distance between pixels identified as trees (or identified as obstacles or debris) and assets identified by the asset location engine 312. For example, the encroachment engine 316 may calculate a distance between the anticipated location of at least one asset and pixels or a segmented image of trees. The encroachment engine 316 may calculate distances from tree pixels to the same asset in any number of images. In some embodiments, the encroachment engine 316 may average calculated distances from tree pixels to the same asset in a number of images.

In some embodiments, the encroachment engine 316 may determine the distance between pixels identified as trees (or identified as obstacles or debris) and zones identified by the asset location engine 312. For example, the encroachment engine 316 may calculate a distance between the anticipated location of at least one zone about an asset and pixels or a segmented image of trees. The encroachment engine 316 may calculate distances from tree pixels to the same zone about an asset in any number of images. In some embodiments, the encroachment engine 316 may average calculated distances from tree pixels to the same zone(s) in a number of images.

The time-series correlation engine 318 may assist in grouping images of the same geographic region from any number of sources based on the images were taken. This may assist in grouping images for the same geographic areas by date. Images of the same geographic area from any number of sources that were taken within a particular period of time or dates may be grouped by the time-series correlation engine 318 and provided for pixel classification to identify trees and proximity of vegetation to zones about any number of assets. Each group of images may be similarly classified, and distances between vegetation and zones about an asset may be assessed to determine change and approximate rates of change (e.g., growth rates).

The rate change engine 320 may be configured to calculate the rate of change of vegetation, obstacles, and debris as well as the rate of encroachment to one or more zones about an asset (or encroachment of the asset). The rate change engine 320 may assess groupings of images taken at different times/dates to be able to determine the rate of change of the distances from pixels to assets or zones about assets. Distances may be calculated by the rate change engine 320 or the encroachment engine 316.

In some embodiments, the rate change engine 320 may use a Kalman filter to determine the rate of change. The Kalman filter may utilize, for example, an observed variable such as year by year observed growth of vegetation (or obstacles or debris) around a given area of interest (e.g., an asset or zone about an asset). It will be appreciated that the rate change engine 320 may utilize any method of calculating the rate of change between pixels of vegetation, obstacles, or debris and assets (or zones about assets).

The criticality score engine 322 may determine a criticality score of an encroachment zone of vegetation (or obstacles or debris) to assets (e.g., utility equipment and/or transmission lines).

If a level of encroachment of the vegetation (e.g., the criticality score) is greater than an alert threshold, the criticality score engine 322 may generate an alert, and interface engine 326 may provide the alert to a user of the utility system 206. In some embodiments, the alert threshold may depend on the growth rate of the tree. For example, a Dawn Redwood growing close to a high-voltage transmission line may have an alert threshold that is lower than that of a Japanese Maple growing close to the high-voltage transmission line since the Dawn Redwood grows faster than a Japanese Maple.

The alert threshold may also depend on a criticality factor associated with the particular segment of utility equipment and/or transmission line, for example, if the failure or outage of a particular high-voltage transmission line results in the loss of power to half of a city due to the configuration of the electricity grid, that particular high-voltage transmission line may have a lower alert threshold.

The workflow segmentation engine 324 may identify segments of the electrical network and calculate a criticality score for that segment. In various embodiments, the workflow segmentation engine 324 may identify feeder lines, segments, or portions of an electrical network. A segment may include any number of spans. A span may be or include a distribution line between or among any number of poles. A span may be a or may represent any topography (e.g., radial) of the optical network. Once the segment is identified by the workflow segmentation engine 324, the workflow segmentation engine 324 may identify criticality scores provided by the criticality score engine 322 for each span or component of the segment. The workflow segmentation engine 324 may average or otherwise combine the criticality scores provided by the criticality score engine 322 for each span or component of the segment to create a segment criticality score.

If the segment criticality score is greater than a predetermined segment threshold, the interface engine 326 may provide an alert.

In another example, a local distribution line that provides electricity to an essential service such as a hospital may have a lower alert threshold than a local distribution line that provides electricity to residential homes. The alert threshold may also depend on the terrain of the geography of the utility equipment and/or transmission lines. For example, a high-voltage transmission line situated on a steep hill may have a lower alert threshold than a high-voltage transmission line situated in a cornfield.

Different segments, spans, or combinations of assets may have different assets and/or weighting in the creation of the criticality scores.

The interface engine 326 may be configured to provide an interface as discussed herein. The interface may allow users of third-parties (e.g., utilities, maintenance companies, insurers, government agencies, or the like) to view different geographic regions and identify areas of concern, recommendations for trimming or corrective action, locations of assets, and the like. The interface may allow the user to control and interact with visualizations and representations of the electrical network (or network of any assets, not just electrical).

It will be appreciated that the IVMS 204 may receive images for any number of different kinds of assets for any number of geographic regions. In one example, the IVMS 204 may retrieve images from different image sources for different geographic areas to enable alerts and interfaces for different management companies (e.g., a first utility responsible for maintaining a network in California and another utility responsible for maintaining a network in Florida). In this example, the IVMS 204 may provide a clearinghouse for assessing images, providing different interfaces with different visualizations, providing different alerts, and the like.

The change information datastore may be any data structure configured to store and log information related to the calculation of the rate of change. Settings, functions, historical calculations, and the like may be stored to enable justification and explanation for calculations of the rate of change of vegetation (or other obstacles or debris) performed by the IVMS 204.

The historical information datastore 330 may be any data structure configured to store and log information related to the images and image assessment over time. Settings, functions, historical calculations, and the like may be stored to enable justification and explanation for calculations for classification of pixels and images deemed relevant by the IVMS 204.

Figure 4:
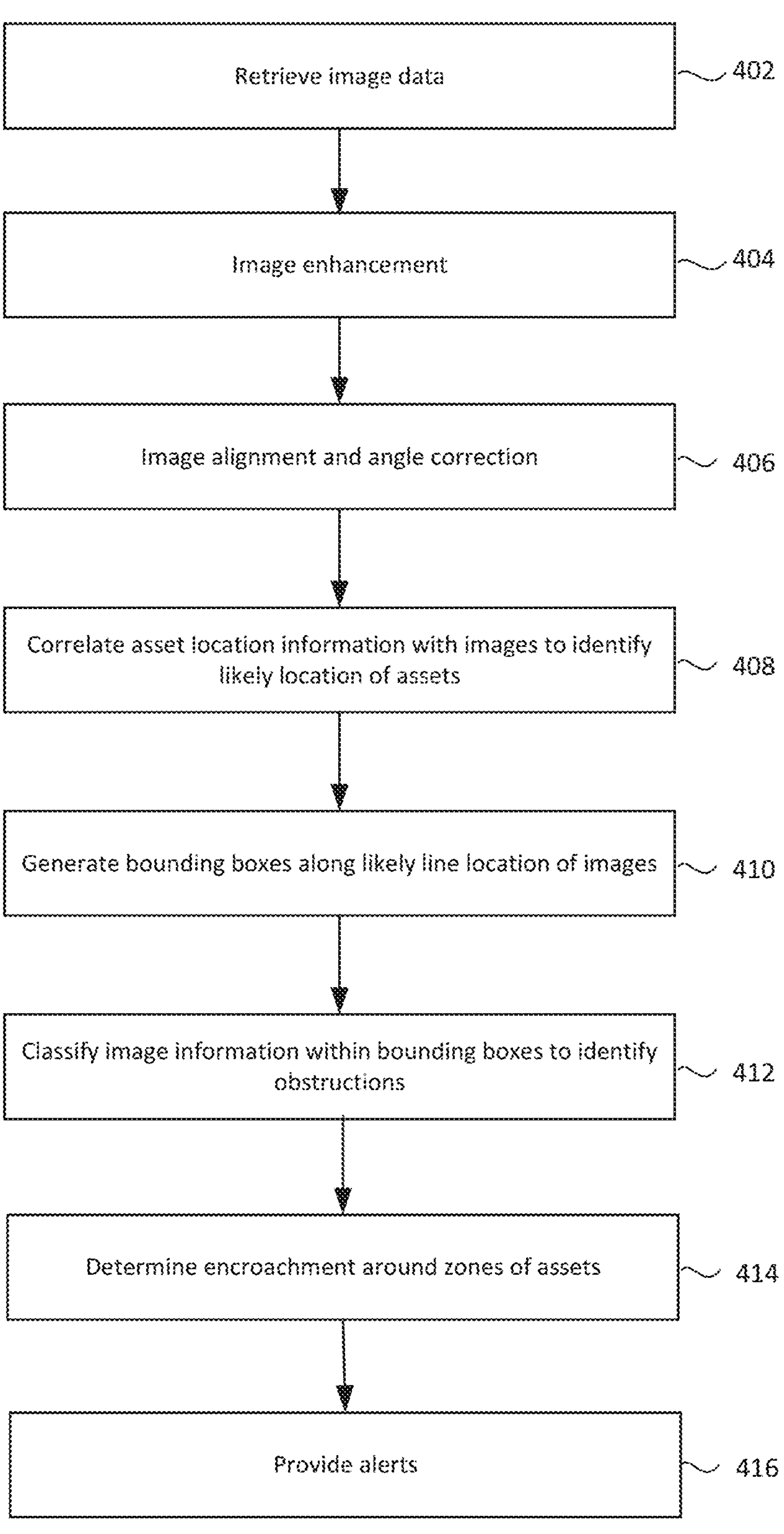
FIG. 4 is a flow chart showing a method for determining encroachment of a zone around an asset and generating an alert according to some embodiments.

FIG. 4 is a method for determining encroachment of a zone around an asset and generating an alert in various embodiments. In this example, the assets discussed herein are part of any connected infrastructure, including, for example, electoral networks, pipelines, roads, bridges, gas lines, highways, or the like. An asset, for example, may be a length of pipe, a length of distribution line, substation, pole, pumping station, or the like.

The assets and or infrastructure may be visible from aerial photography. A management system, such as IVMS 204, may retrieve aerial images from any number of sources, identify obstacles within zones around assets, measured the degree of encroachment of those obstacles on those zones, and provide alerts or information for maintenance. This system may be particularly advantageous for infrastructure that tends to be located in areas that are difficult to access, such as rugged terrain, as well as infrastructure that is spread out over large geographic areas.

The management system may include any number of digital devices in communication with a communication network. The management system may analyze images for similar types of infrastructure managed by different entities (e.g., the management system may provide assessment and maintenance information for different gas pipelines or electrical networks that are managed by different, unrelated entities). In some embodiments, the management system may analyze images for different types of infrastructure managed by different entities. For example, the same management system may assess images of an electrical network in California and may assess images for natural gas pipelines in Texas. The measurement system may allow the decentralization of any distributed infrastructure of similar or different types.

In step 402, the communication module 302 of a management system may retrieve images of a geographic area where one or more assets of the infrastructure are located. The images may be retrieved from any number of image sources 202A-N. The management system may include similar functionality as the IVMS 204. In some embodiments, the management system provides an assessment of vegetation, obstacle, and debris encroachment of an asset of an electrical network. In some embodiments, the management system provides an assessment of other types of obstacles and debris encroachment of an asset of another type of infrastructure.

In some embodiments, a user at a third-party system (e.g., utility system 206) using a digital device may log into an interface provided by the management system. When logging onto the system, the management system may identify the infrastructure and assets associated with the particular account and/or third-party.

In step 404, the image enhancement engine 306 may enhance any or all of the retrieved images. In some embodiments, this step is optional. The image enhancement engine 306 may utilize computer vision techniques to improve and enhance any number of images. For example, the image enhancement engine 306 may utilize techniques such as histogram equalization, contrast enhancement, bilinear interpolation, or some combination thereof to generate high-resolution images from low-resolution images In some embodiments, the image enhancement CNN engine 308 may optionally apply a u-net CNN to any number of the received images to improve and enhance the images as discussed herein.

In step 406, the image alignment and angle correction engine 310 may optionally change the image alignment and angle of images. In some embodiments, the image alignment and angle correction engine 310 may utilize a different coordinate system that an image source 202A and make corrects. In some embodiments, the image alignment and angle correction engine 310 may depict landmarks or features that can be aligned to correct alignment and correct angles for one image or among many images (e.g., for consistency).

In step 408, the asset location engine 312 may determine or track the location of an asset in any number of images. In some embodiments, the asset location engine 312 may obtain locations (e.g., coordinates) of assets from a third-party responsible for the assets (e.g., a utility system 206 may provide coordinates of electrical assets in a geographic region of interest to the asset location engine 312. The asset location engine 312 may utilize coordinates in metadata associated with one or more images to identify likely locations of the asset(s) in any number of images.

In some embodiments, the management system may not visually confirm that the assets are depicted in the images. In one example, the management system receives coordinates or other information regarding the position and location of assets. The asset location engine 312 may correlate the coordinates or other information of the assets with the coordinates or other location information in metadata associated with images. The asset location engine 312 may assign portions of images as being locations where assets are located or are likely to be located. These assigned portions may be the basis for the location of any number of zones that surround the asset(s).

In various embodiments, the management system may visually confirm the assets depicted in the images. In some embodiments, the management system may receive manual verification or updated location information of the location of the asset(s) depicted in the image. In one example, the management system may utilize instance segmentation to classify and recognize assets within an image and then, based on the metadata location information associated with the image, confirm or update location information for the asset(s) provided by the third-party company (e.g., provide location information or provide changes to be applied to the third-party company) such as the utility system 206.

In some embodiments, the asset location engine 312 or the encroachment engine 316 may determine any number of zones around any number of assets. As discussed herein, zones may be identified manually and/or the process may be automated. In one example of automation, the encroachment engine 316 may identify zones (e.g., the breadth, expansiveness, and shape of any number of zones) based on the type of asset, type of terrain, expected weather conditions, risk of hazards (e.g., fire, avalanche), risk to communities, and/or the like.

In step 410, the classification engine 314 may classify pixels of any number of images to assist in determining depicted obstructions' proximity to any number of zones about any number of assets. As discussed herein, the classification engine 314 may designate any number of bounding boxes within an image. The location of bounding boxes within the image may be based on the location or likely location of assets within the image (e.g., based on the location of assets as determined or identified by the asset location engine 312. Utilizing bounding boxes in this matter may enable scalability and computational efficiency (e.g., to avoid classifying every pixel of every image, including those pixels least likely to provide relevant information regarding possible obstacles that may encroach on assets or zones about assets).

In step 412, the classification engine 314 may classify image information within bounding boxes to identify obstructions. For example, the classification engine 314 may utilize a u-net CNN on the pixels within the bounding boxes and/or k-means clustering to identify any or all pixels within the bounding boxes and classify the pixels as belonging to any number obstruction (e.g., vegetation, fallen rocks, debris, tailings, or the like) and non-obstructions (e.g., dirt, roads, shadows, and/or the like).

In step 414, the encroachment engine 316 may determine the encroachment of the obstruction to the asset or zones of the asset based on the assessment of the distance from pixels classified as being to proximity to the location (or likely location) of assets in the images. In some embodiments, the encroachment engine 316 may determine boundar(ies) about any number of obstructions, identify the pixels of the boundar(ies) closest to the edge of any number of zones, and measure distances using the image.

In step 416, the interface engine 326 may provide an alert to the user if the encroachment of the obstacles is too close or within zones of concern. In various embodiments, the criticality score engine 322 may assign scores based on weighting distances between obstructions (e.g., the depicted edge of an obstruction) and the location of one or more zones as well as factors such as the likelihood of fire, the impact of infrastructure/asset failure, risk to communities, risk of life, cascading effects of failure on the infrastructure/network, and the like.

In some embodiments, the criticality score engine 322 may generate criticality scores for any number of spans or parts of the infrastructure. The workflow segmentation engine 324 may group different segments of the infrastructure and generate a segment score to assist in recommendations for maintenance, correction, and/or measurement of risk. A segment may be a combination of spans, circuits, assets, and the like to assist in workflow assignment and risk assessment.

The interface engine 326 may provide alerts in an interface (e.g., upon login) by providing text messages, email, IMS, notifications, and the like on any digital device.

Figure 5:
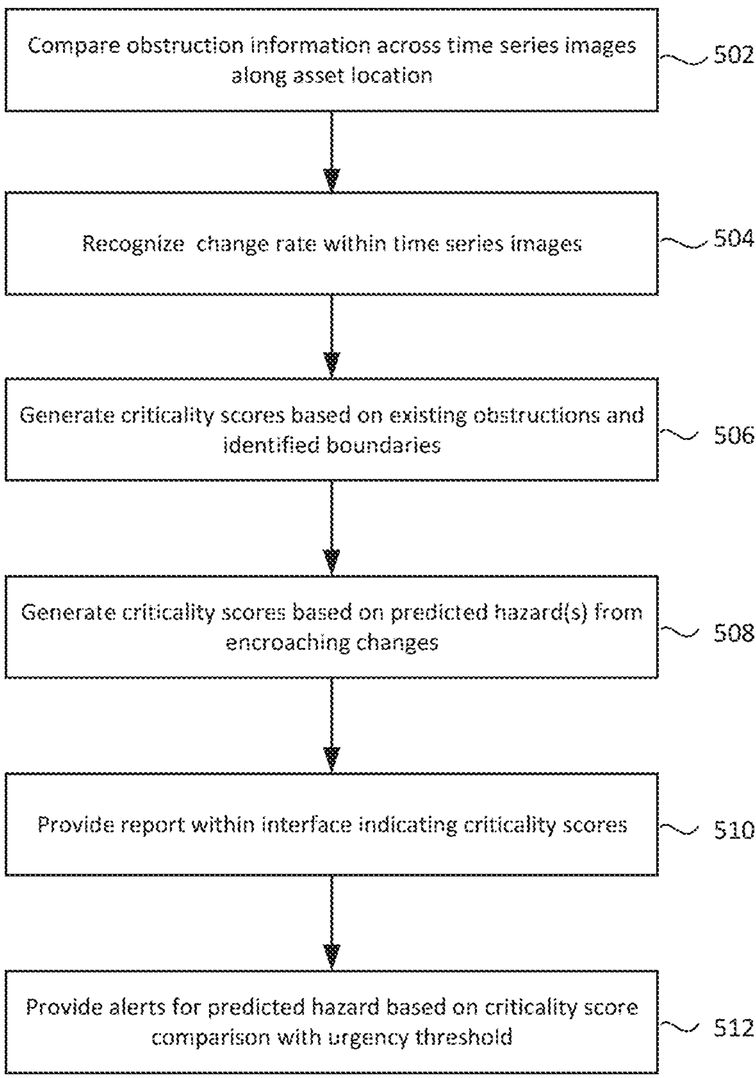
FIG. 5 is a flow chart showing a method for determining the rate of change of obstructions over time and providing alerts according to some embodiments.

FIG. 5 depicts a method for determining the rate of change of obstructions over time and providing alerts in some embodiments. Some obstructions may build or grow over time. For example, debris may mount (e.g., caused by wind), snow may gather, vegetation may grow, and the like. The management system may collect and analyze images of the same geographic area (e.g., containing the same assets) over the years to identify rates of change of obstruction and the rate of growth towards zones and/or assets. In various embodiments, the management engine may approximate continued growth based on past growth behavior captured in aerial images over time and provide alerts and/or criticality scores based on the approximation.

In step 502, the rate change engine 320 may compare obstruction information across time-series images along an asset location. In various embodiments, the management system may receive images of the same geographic area every year for a number of years. Using the system described herein (e.g., see FIG. 4), the management system may identify the proximity of obstructions to zones and/or assets. The rate change engine 320 may identify the rate of change of the distance between pixels debarking a boundary of the obstruction to one or more zones in step 504.

In step 506, the criticality score engine 322 may generate a criticality score engine alert for obstructions that are already interfering with assets and or related zones without necessarily taking into account the rate of change.

In step 508, the criticality score engine 322 may generate criticality scores for spans, assets, segments, and/or the like and take into account the identified rate of change. In some embodiments, the rate of change may be implemented as a weight in existing or currently calculated criticality scores. For example, as discussed herein, the criticality score engine 322 may generate a criticality score engine alert for obstructions that are already interfering with assets and or related zones without necessarily taking into account the rate of change. If the management system identifies obstructions as not yet reaching a zone of interest about an asset but approaching closely to the zone of interest (e.g., within an encroachment threshold), the management system may assess the rate of change and increase the criticality score and/or provide alerts to avoid hazards or failure in the near future.

In step 510, the interface engine 326 may provide an interface or provide a report indicating criticality scores as well as related portions of the infrastructure. For example, the interface engine 326 may depict a geographic area as well as a network. Portions of the network may be colored based on criticality scores (e.g., either criticality scores of assets or segment criticality scores).

In step 512, the interface engine 326 may provide alerts for a predicted hazard, risk, or imminent failure based on a comparison with a criticality score or segment criticality score with an urgency threshold. The urgency threshold may indicate the point where the risk of failure, risk of fire, risk of cascading damage, risk to the infrastructure, risk to the asset, risk to the community, and/or the like is too high, and immediate action is required.

Figure 6:
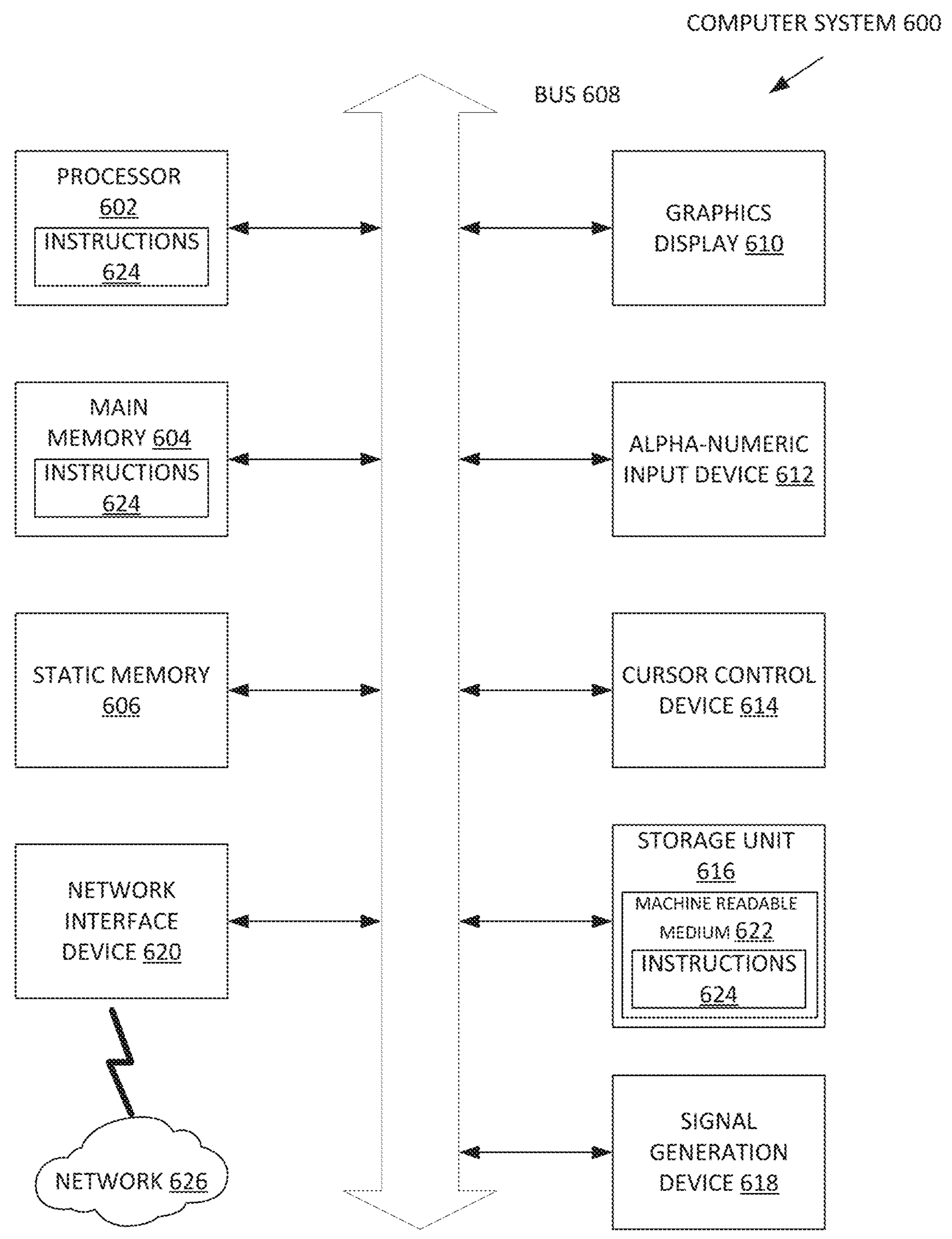
FIG. 6 depicts a block diagram of an example computing device according to some embodiments.

FIG. 6 is a block diagram illustrating entities of an example machine able to read instructions from a machine-readable medium and execute those instructions in a processor to perform the machine processing tasks discussed herein, such as the engine operations discussed above. Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment or as a peer machine in a peer-to-peer (or distributed) network environment.

The machine may be a server computer, a client computer, a personal computer (P.C.), a tablet P.C., a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The computer system 600 may also include an alphanumeric input device 612 (e.g., a keyboard), a cursor control device 614 (e.g., a mouse, a trackball, a joystick, a motion sensor, or other pointing instrument), a data store 616, a signal generation device 618 (e.g., a speaker), an audio input device 626 (e.g., a microphone) and a network interface device 620, which also are configured to communicate via the bus 608.

The data store 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. Instructions 624 (e.g., software) may be transmitted or received over a network (not shown) via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example, as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single-engine. In an embodiment where the engines as implemented by software, they are stored on a computer-readable persistent storage device (e.g., hard disk), loaded into the memory, and executed by one or more processors as described above in connection with FIG. 6. Alternatively, hardware or software engines may be stored elsewhere within a computing system.

As referenced herein, a computer or computing system includes hardware elements used for the operations described here regardless of specific reference in FIG. 6 to such elements, including, for example, one or more processors, high-speed memory, hard disk storage, and backup, network interfaces and protocols, input devices for data entry, and output devices for display, printing, or other presentations of data. Numerous variations from the system architecture specified herein are possible. The entities of such systems and their respective functionalities can be combined or redistributed.

Figure 7:
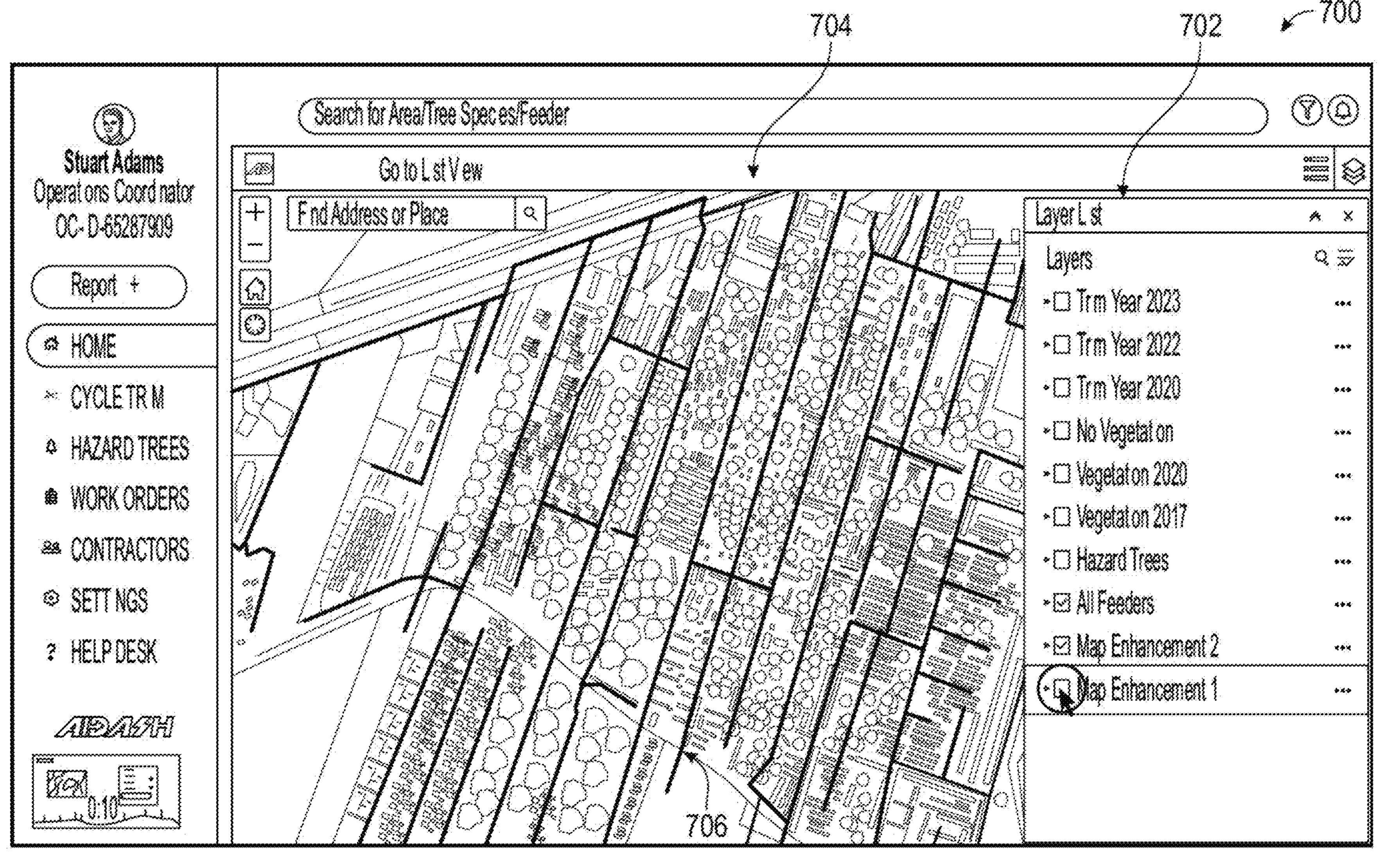
FIG. 7 is an example user interface of a satellite map of a physical environment with annotation representing the location of power lines overlying the map according to some embodiments.

FIG. 7 is an example user interface 700 according to some embodiments. The user interface 700 includes aerial images captured using satellite imagery, aviation photography, drone imagery, or some combination thereof. The user of the IVMS may select the area of the Earth to view. The example user interface 700 includes a legend 702, which depicts a layer list that overlays annotation over a satellite map 704. An annotation 706 depicts the location of utility equipment such as power lines according to some embodiments.

Figure 8:
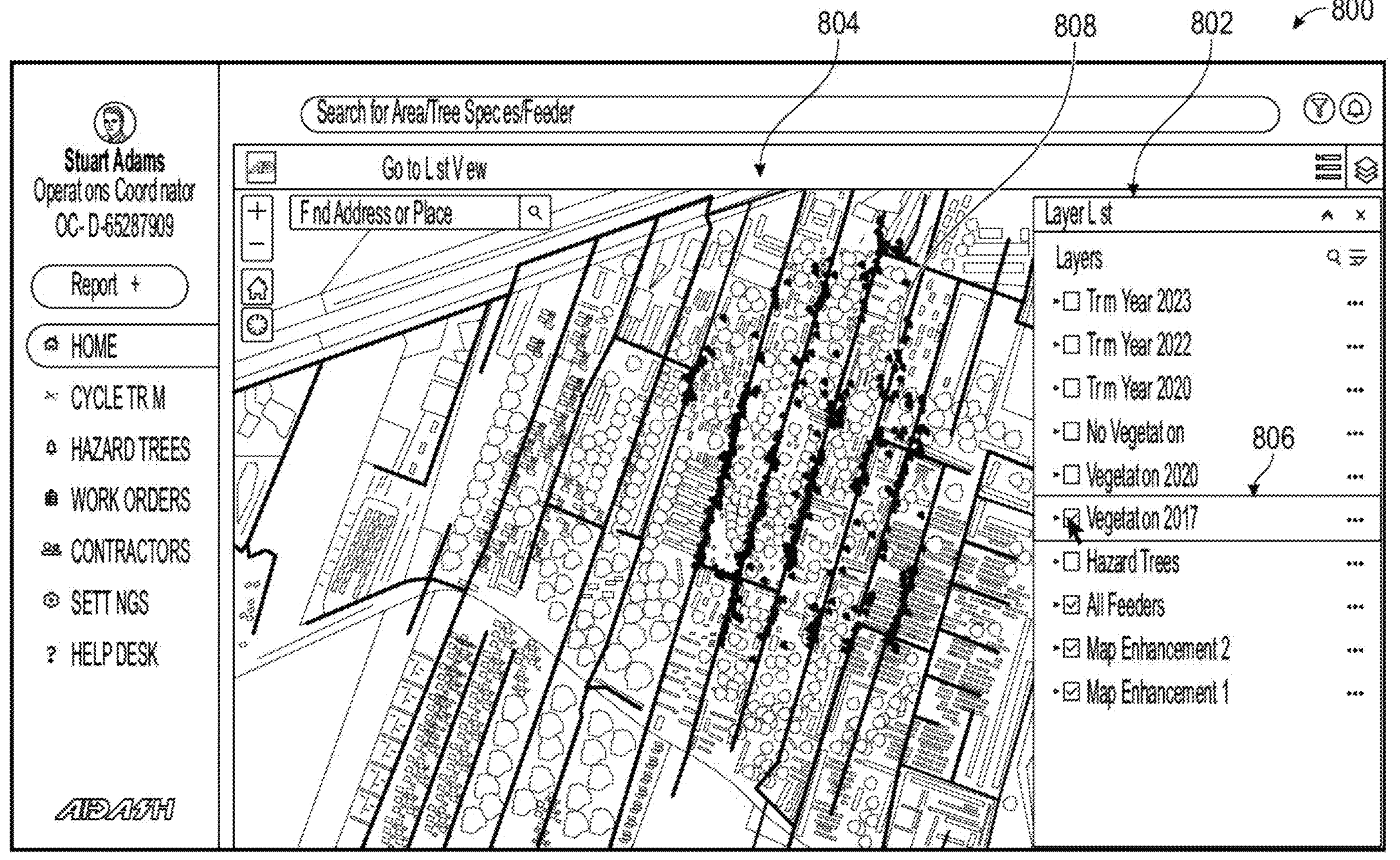
FIG. 8 is an example user interface of the satellite map with annotation representing the location of power lines and vegetation overlying the map according to some embodiments.

FIG. 8 is another example user interface 800 of the satellite map according to some embodiments. The user interface 800 includes a legend 802 depicting the list of layers that may be overlaid onto a satellite map 804. The user interface 800 includes annotation representing the location of power lines and vegetation as depicted in the satellite map 804. By choosing check box 806, the satellite map 804 includes annotation depicting locations of vegetation in the area represented by the satellite map 804, which was trimmed in 2017.

Figure 9:
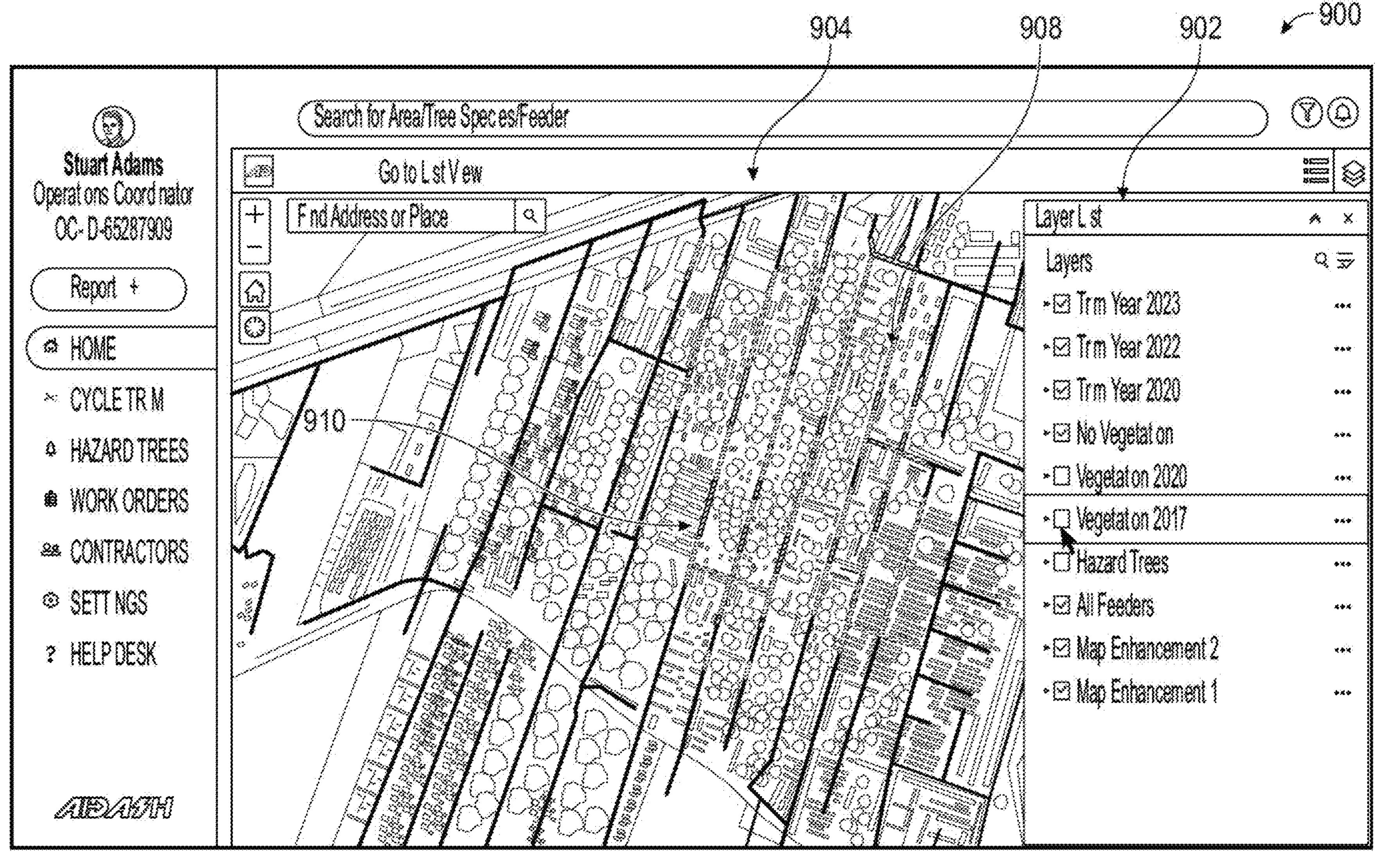
FIG. 9 is an example user interface of the satellite map with annotation representing the location of vegetation that require trimming in different time frames according to some embodiments.

FIG. 9 is an example user interface 900 of the satellite map according to some embodiments. The user interface 900 includes a legend 902 depicting the list of layers that may be overlaid onto a satellite map 904. The user interface 900 includes annotation representing the location of power lines and vegetation as depicted in the satellite map 904. The satellite map 904 includes segments that represent a trim frame in which vegetation trimming is required or scheduled. For example, annotations 908 and 910 represent two spans of power lines.

Figure 10:
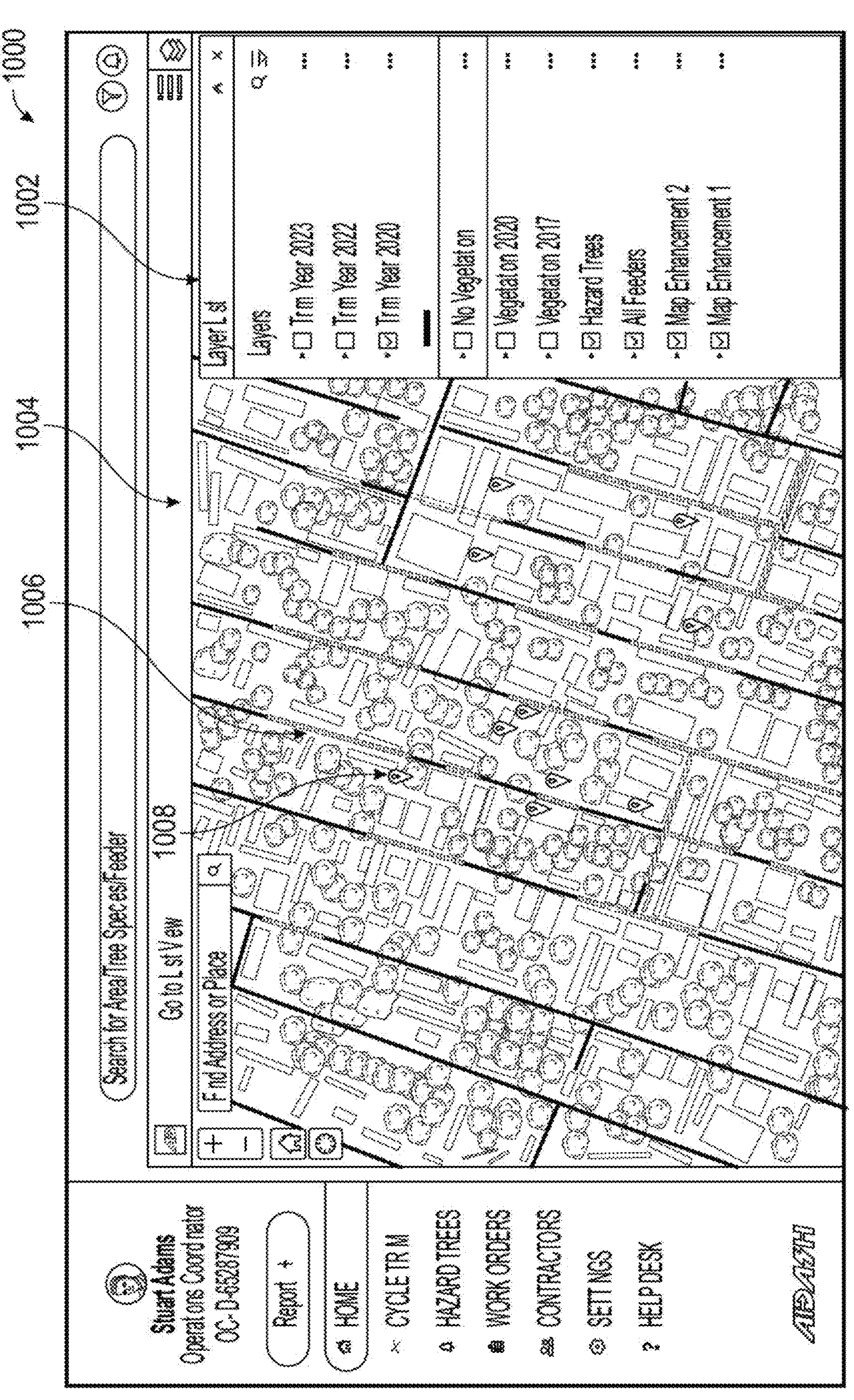
FIG. 10 is an example user interface of the satellite map with annotation representing the location of vegetation that require trimming in a particular year and with icons representing the location of trees with require attention according to some embodiments.

FIG. 10 is an example user interface 1000 of the satellite map according to some embodiments. The user interface 1000 includes a legend 1002 and annotation representing the location of power lines and vegetation overlaid on a satellite map 1004. For example, the IVMS determines that vegetation around a span of power lines corresponding to the location represented in an annotation 1006 requires trimming or is scheduled for trimming in 2020. Icon 1008 may correspond to vegetation, such as a tree, which is particularly hazardous, or high priority. In some embodiments, the user may interact with the annotation 1006. In response to the user interacting with the annotation 1006, the IVMS may provide further details regarding vegetation trimming that is recommended in 2020 in that particular geographic location represented by the annotation 1006. An example of this can be seen in window 1106 of FIG. 11.

Figure 11:
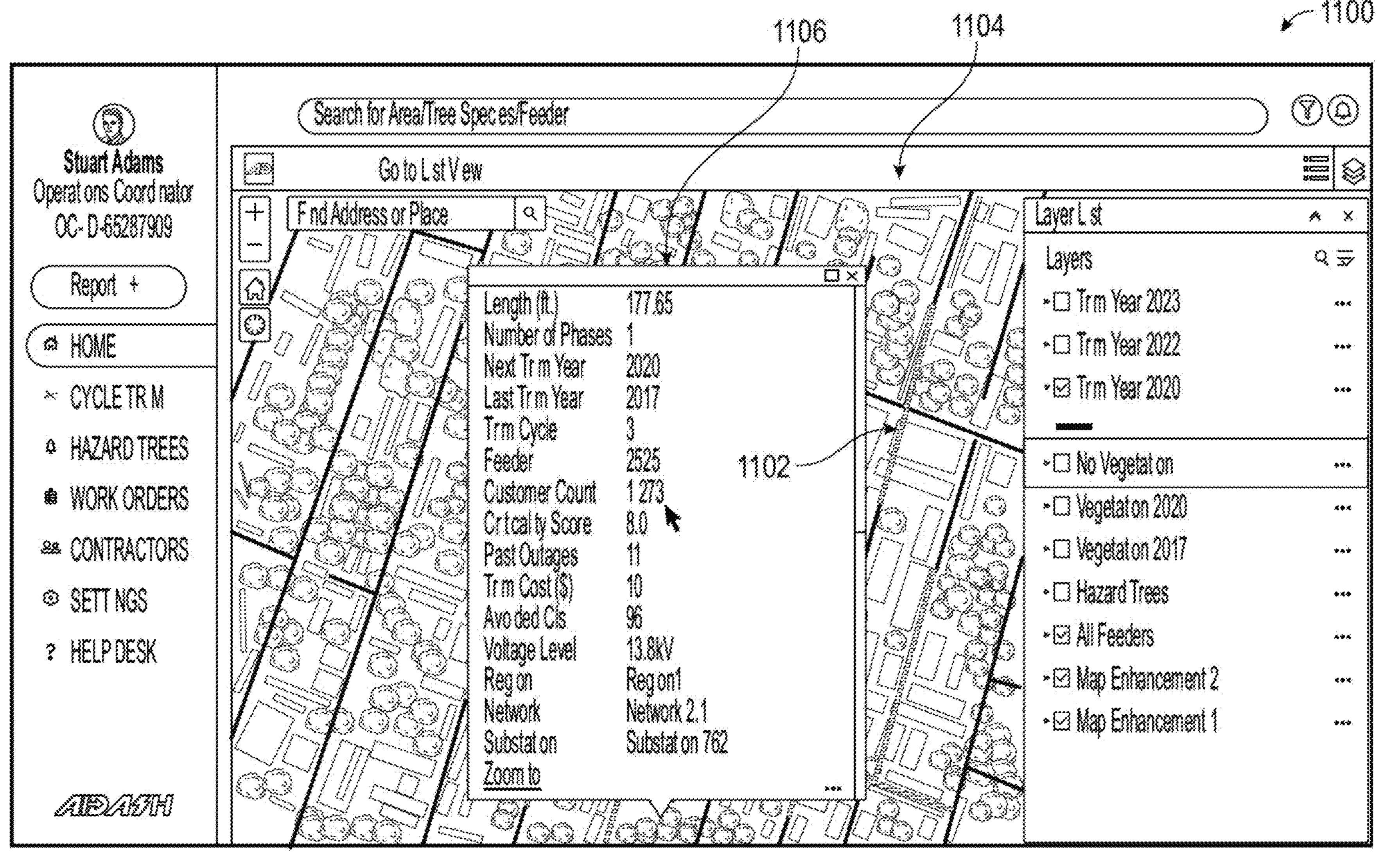
FIG. 11 is an example user interface of the satellite map showing details regarding work required to trimming vegetation from a particular segment of power lines according to some embodiments.

FIG. 11 is an example user interface 1100 includes a satellite map 1104 according to some embodiments. When a user of the IVMS interacts with a particular span of power lines that require trimming, such as the window 1106, details regarding a particular span of power line 1102 that require vegetation trimming, the window 1106 may include details such as the length of the segment, when the next time vegetation trimming is scheduled in that segment, and the number of utility customers served by the segment.

Figure 12:
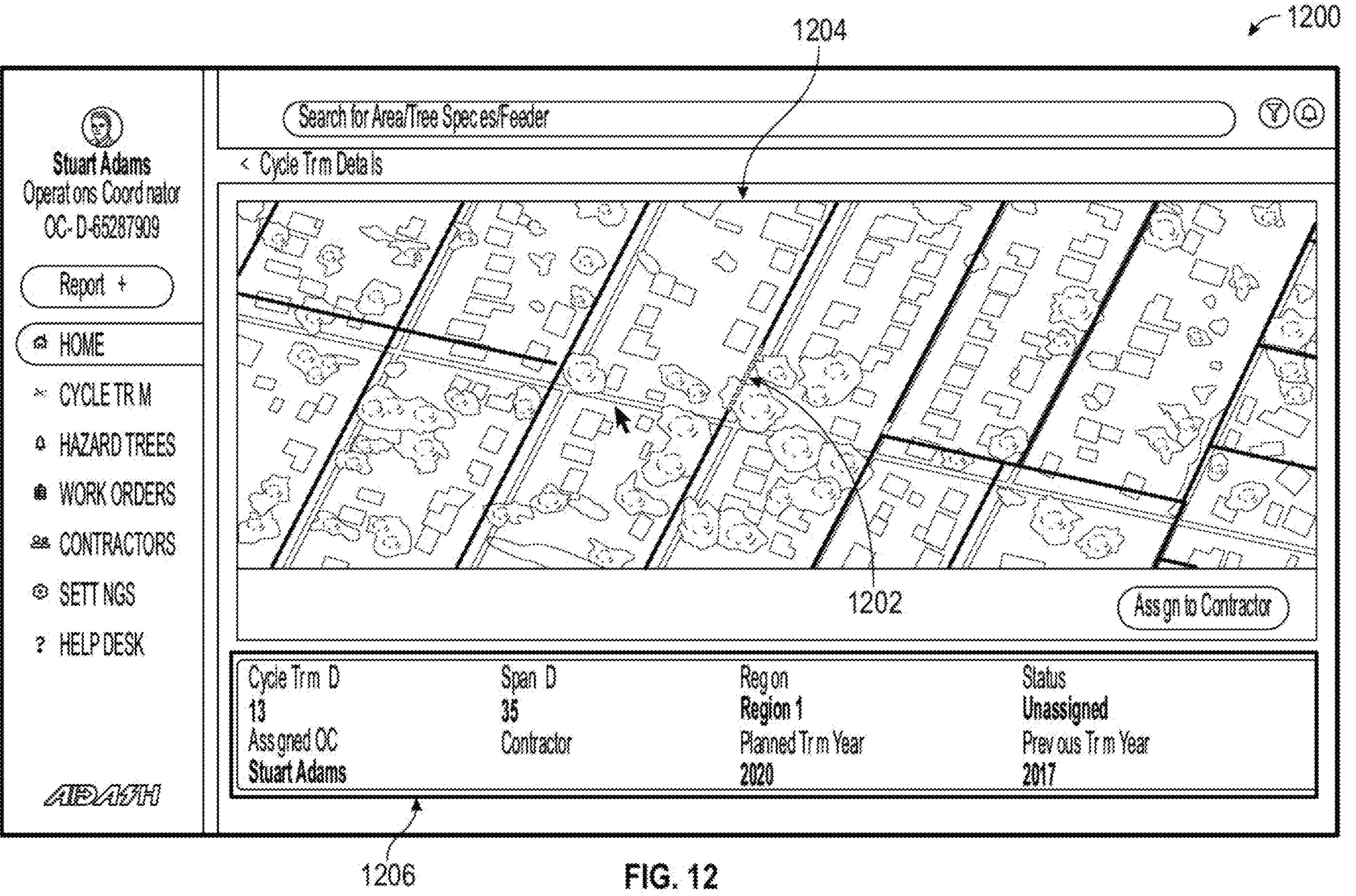
FIG. 12 is an example user interface of a closer view of a particular location on the satellite map, which requires vegetation trimming showing further details of work previously performed at this particular location according to some embodiments.
Figure 13:
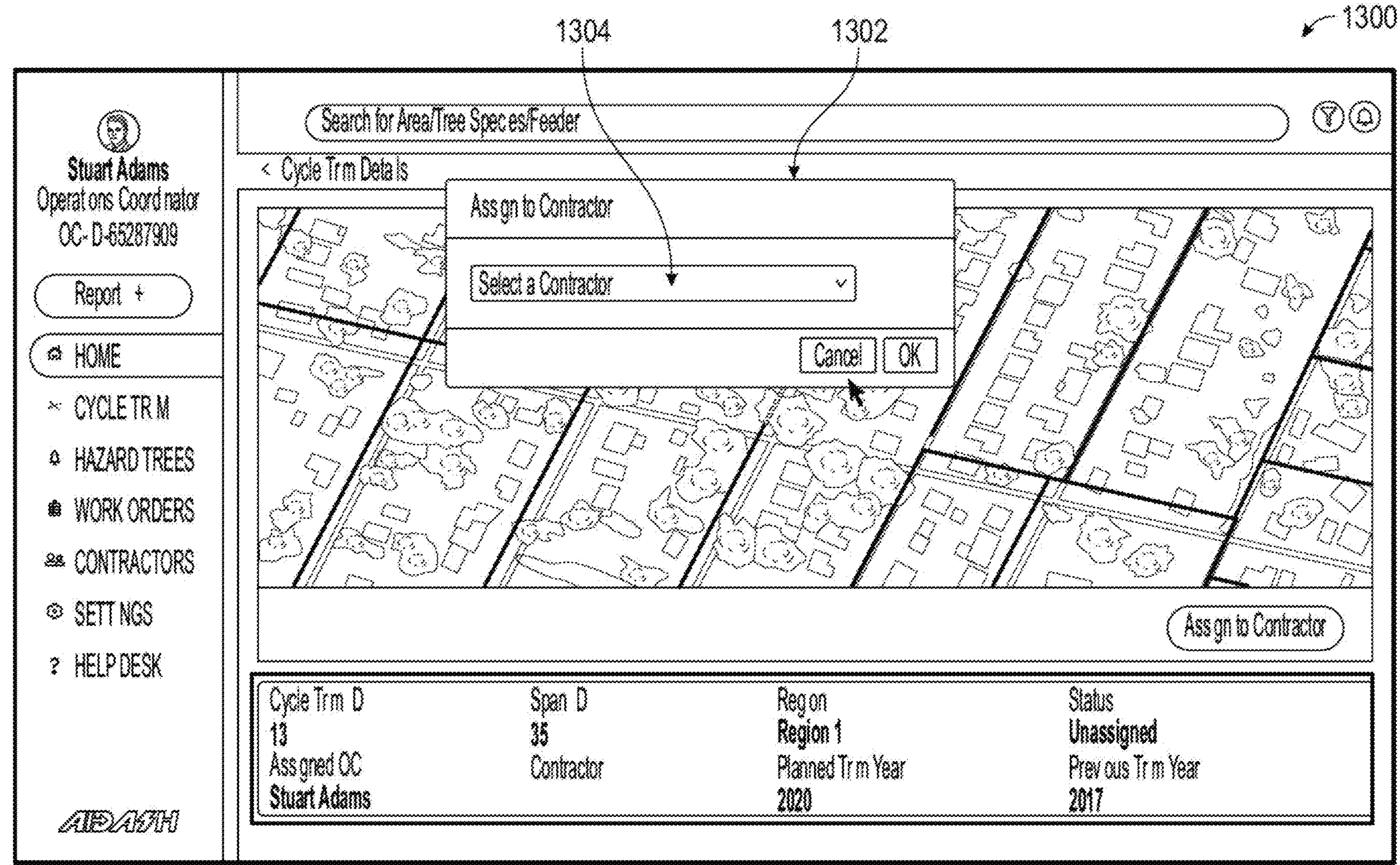
FIG. 13 is an example user interface of assigning a work order to a particular contractor according to some embodiments.

In some embodiments, the user may interact with one or more annotations representing geographic location, which require vegetation trimming, and obtain more details regarding a particular geographic location. An example of this can be seen in FIG. 12, which provides details regarding a particular segment 1202 of power lines on a satellite map 1204. The user interface 1200 further includes area 1206, which shows further details such as when work was previously performed at the particular segment, a span I.D., a region I.D., and when trimming will next be performed at the particular segment. Once the user is provided more details regarding a particular geographic location that requires vegetation trimming, the user may assign a work order to trim the vegetation at that particular geographic location to a particular contractor. An example user interface 1300 of FIG. 13 is provided to the user to assign a work order associated with the particular segment 1202 in FIG. 12 to a particular contractor according to some embodiments. The user may interact with the pull-down at 1304 and select a contractor.

Figure 14:
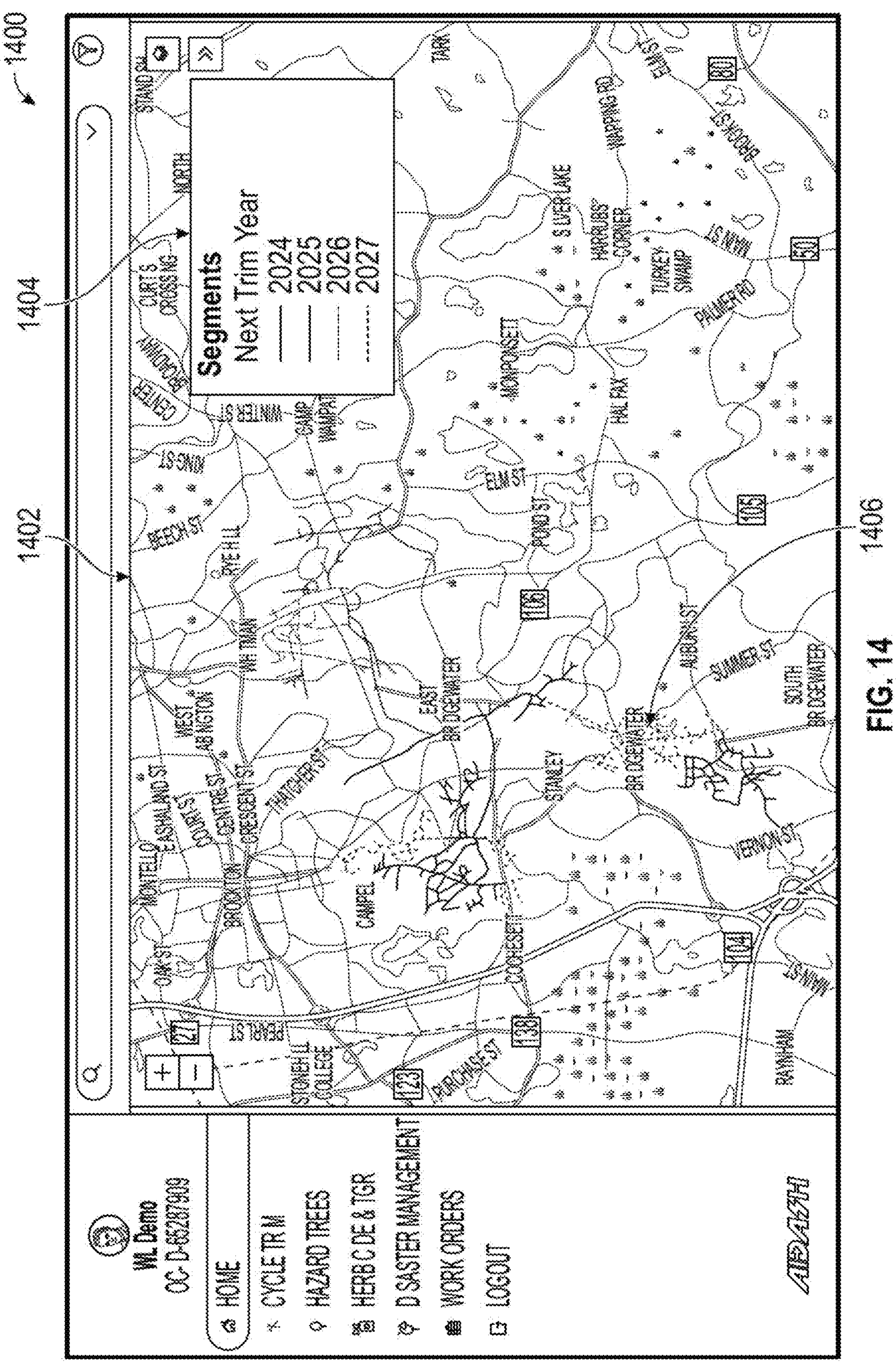
FIG. 14 is another example user interface of a map with annotation representing the location of vegetation that require trimming in different time frames according to some embodiments.
Figure 15:
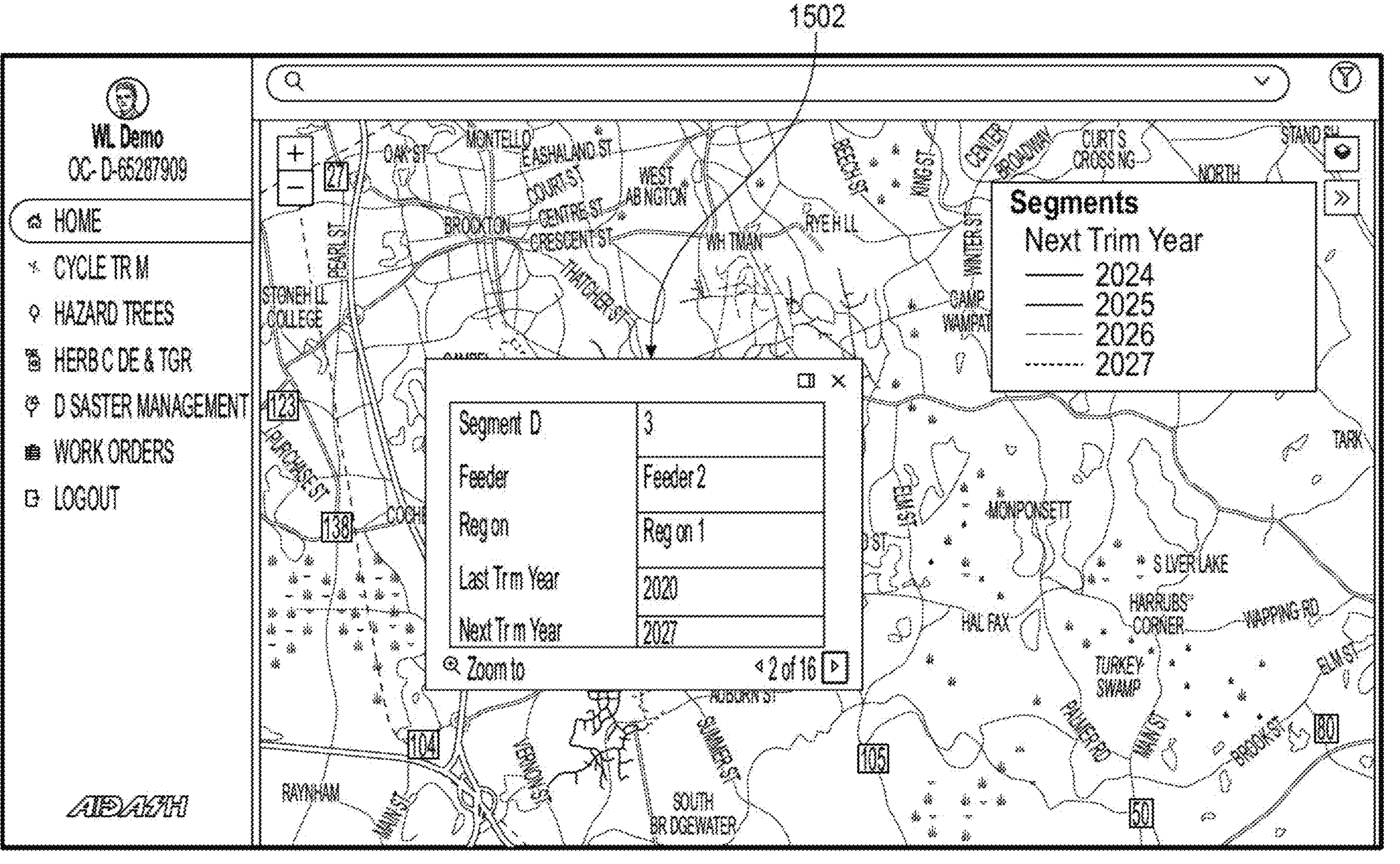
FIG. 15 is another example user interface with a map showing details regarding a work order at a location of vegetation that requires trimming according to some embodiments.

FIG. 14 is another example of user interface 1400 according to some embodiments. The user interface 1400 includes a map 1402 and a legend 1404. Map 1402 is similar to the satellite map 704, but map 1402 depicts a larger geographic area. An annotation 1406 a large geographic area that requires vegetation trimming in 2027. The user may interact with annotation 1406 to view details regarding vegetation trimming that may be seen in window 1502 of FIG. 15. Window 1502 may show details regarding a particular segment of power that requires trimming, such as the length of the segment, when the next time vegetation trimming is scheduled in that segment, and when the segment was last trimmed.

Figure 16:
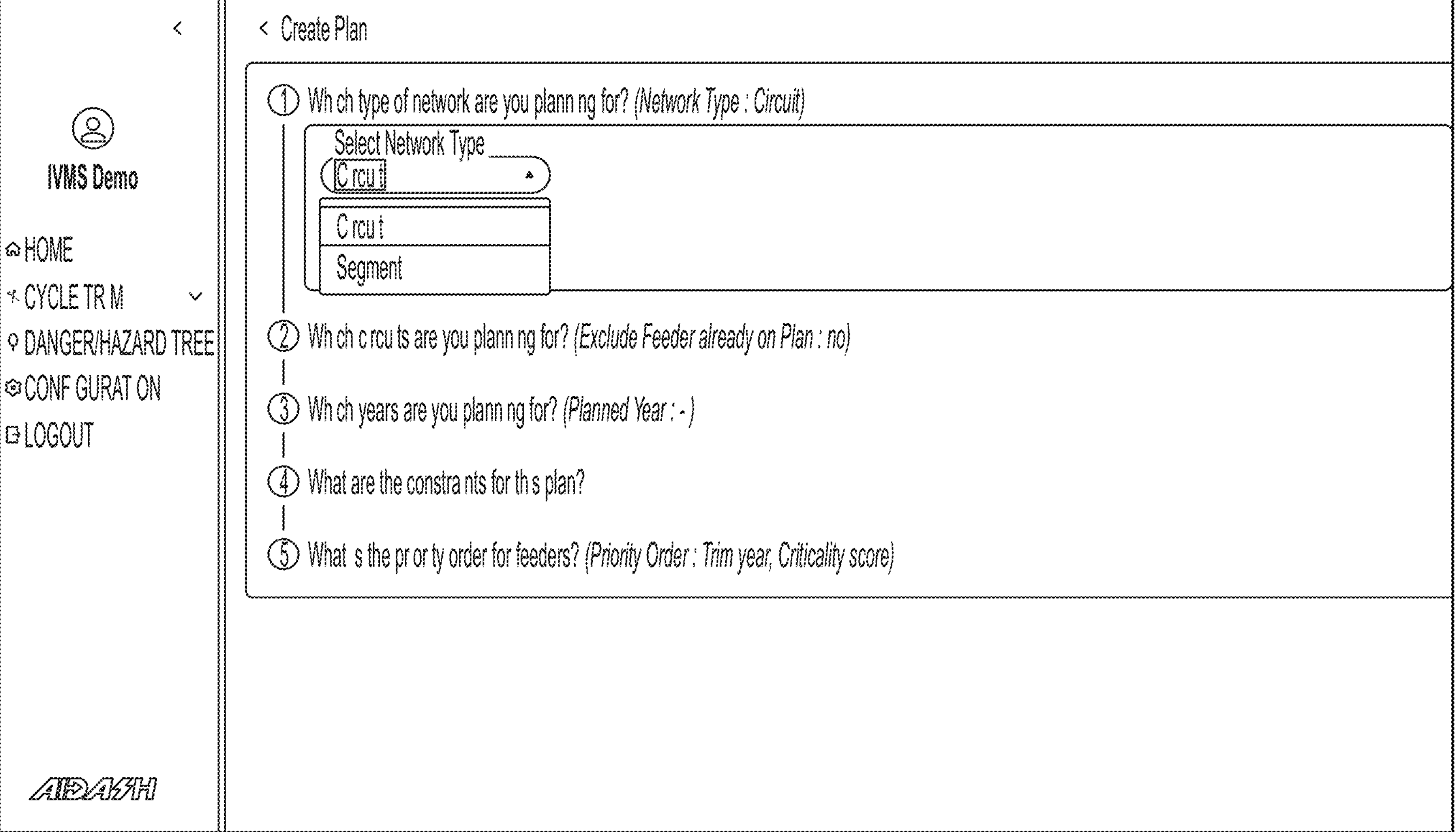
FIG. 16 is an example user interface depicting the first step of the creation of a work order plan according to some embodiments.

The user may generate a plan to trim vegetation from a particular portion of power lines according to some embodiments. FIG. 16 depicts the first step of the creation of a trim cycle. The user may choose the type of network to limit the creation of the trim cycle. The type of network may include a circuit or segment. A segment may include multiple spans of utility equipment such as transmission lines. In one embodiment, one span of a transmission line is defined as a length of transmission line between two adjacent utility poles. In some embodiments, a segment includes transmission lines that transmit electricity from the same distribution substation. In various embodiments, a circuit may include transmission lines and distribution substations which share the same transmission substation.

Figure 17:
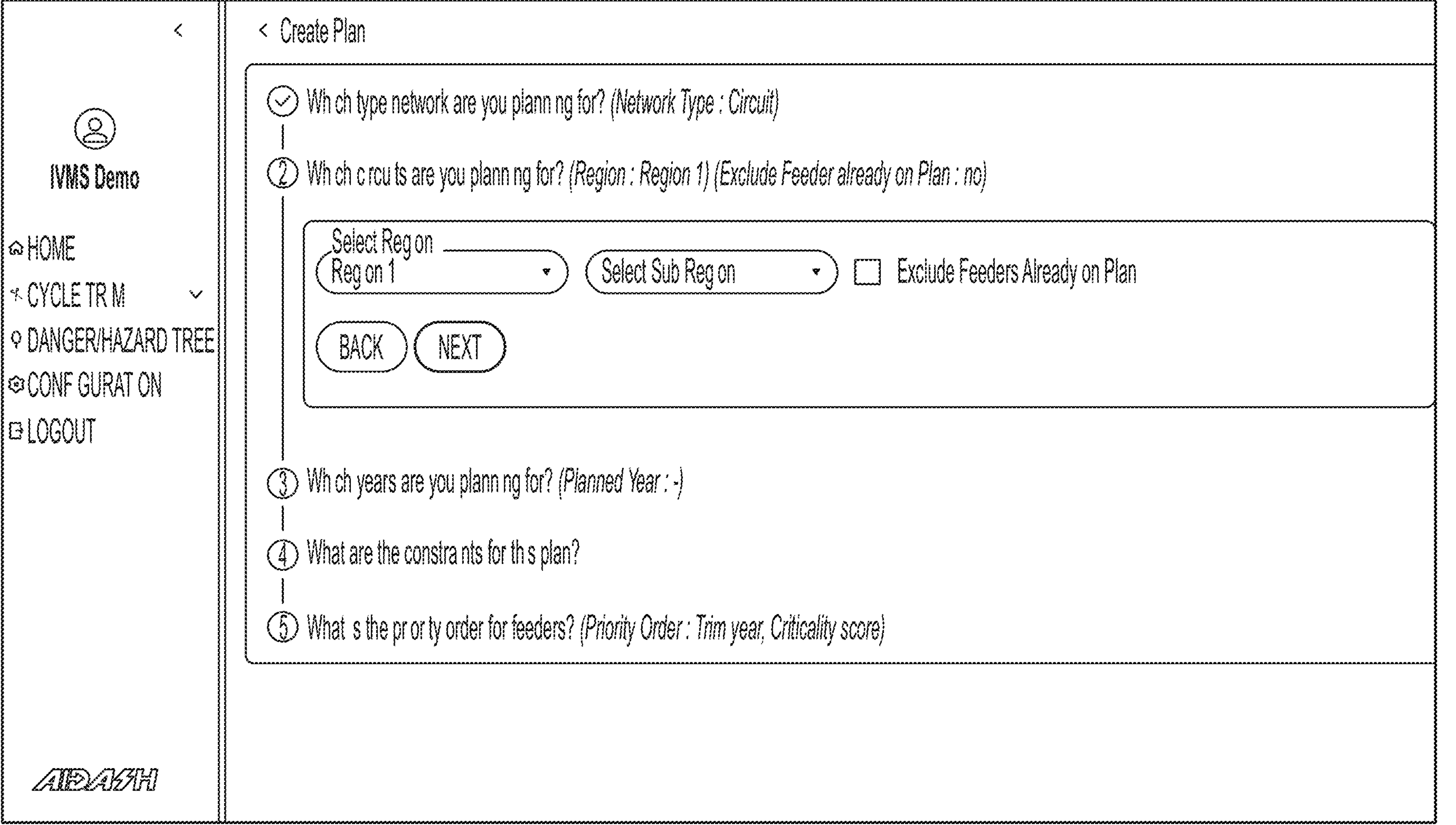
FIG. 17 is an example user interface depicting a second step of the creation of a trim cycle according to some embodiments.
Figure 18:
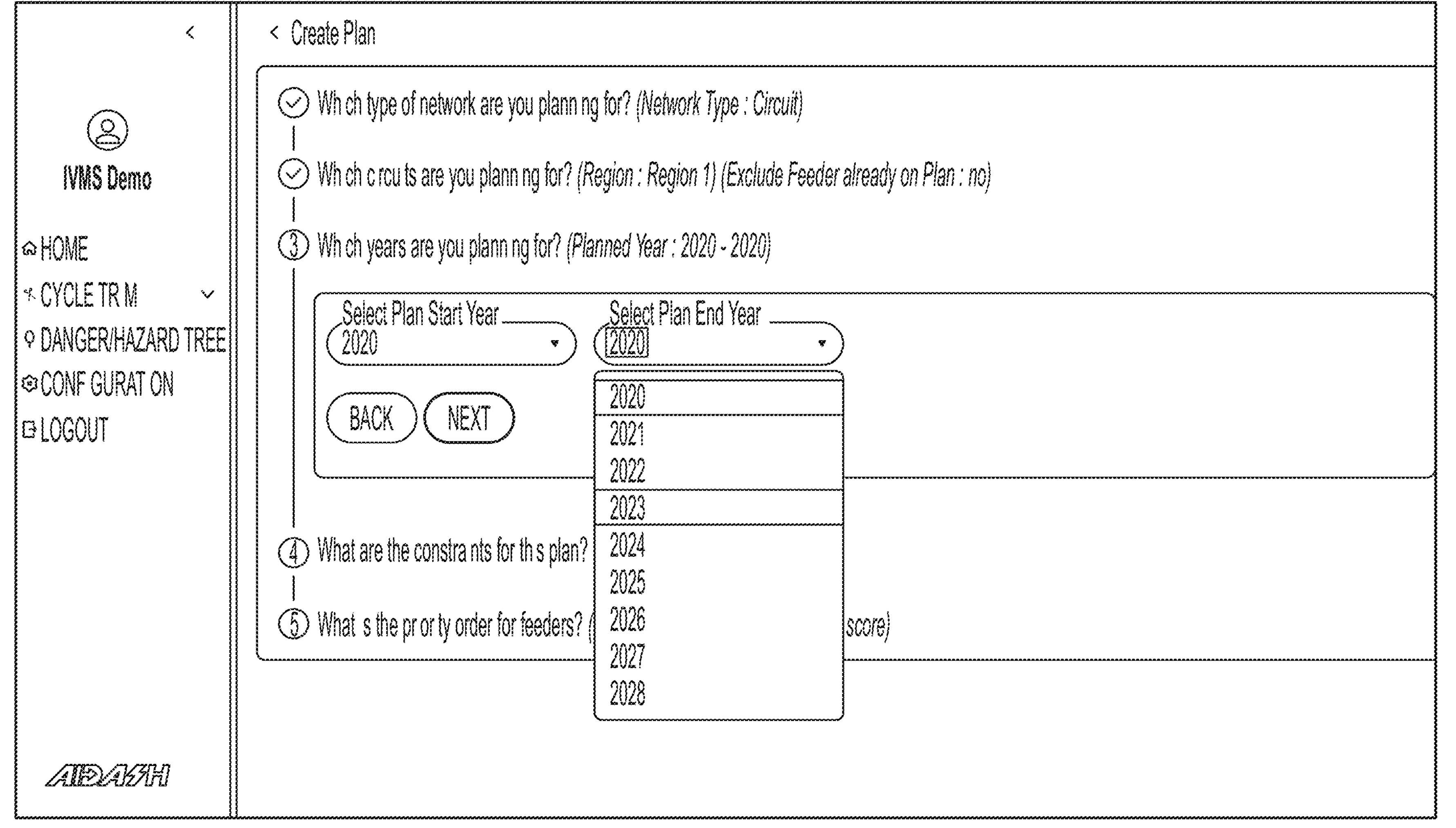
FIG. 18 is an example user interface depicting a third step of the creation of a trim cycle according to some embodiments.
Figure 19:
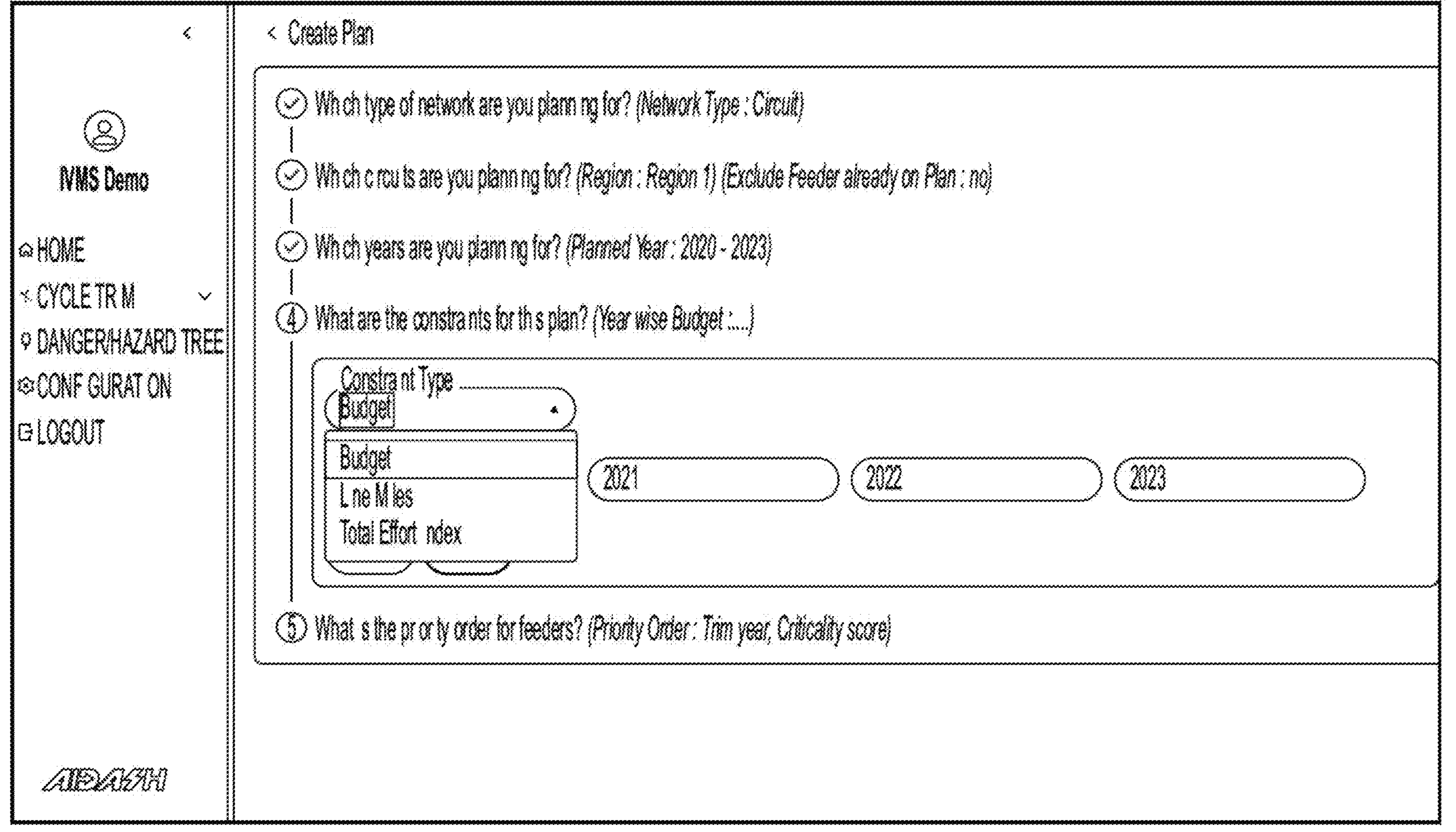
FIG. 19 is an example user interface depicting a fourth step of the creation of a trim cycle, selecting a constraint type according to some embodiments.
Figure 20:
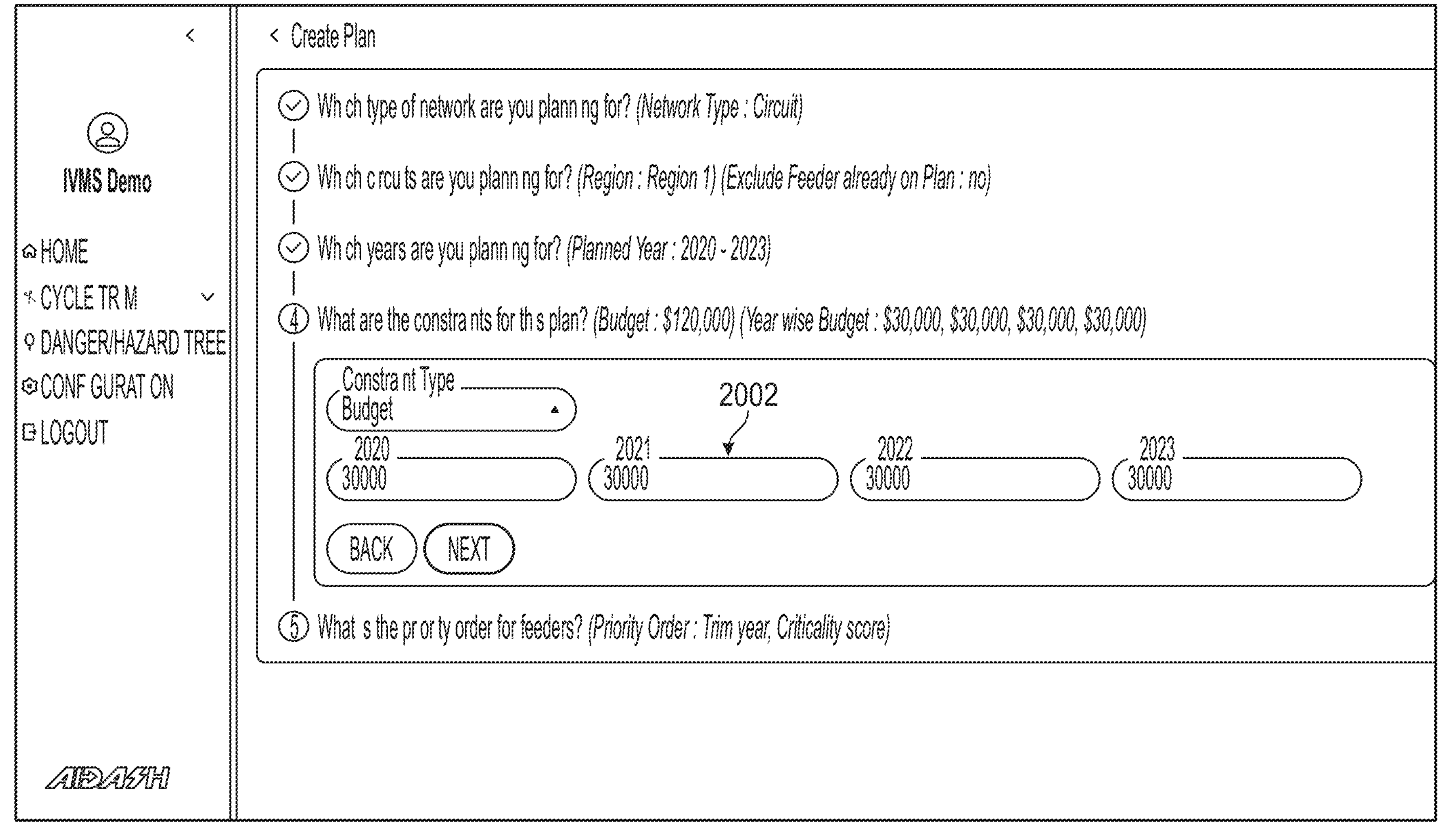
FIG. 20 is an example user interface depicting the fourth step of the creation of a trim cycle inputting a year-wise budget according to some embodiments.
Figure 21:
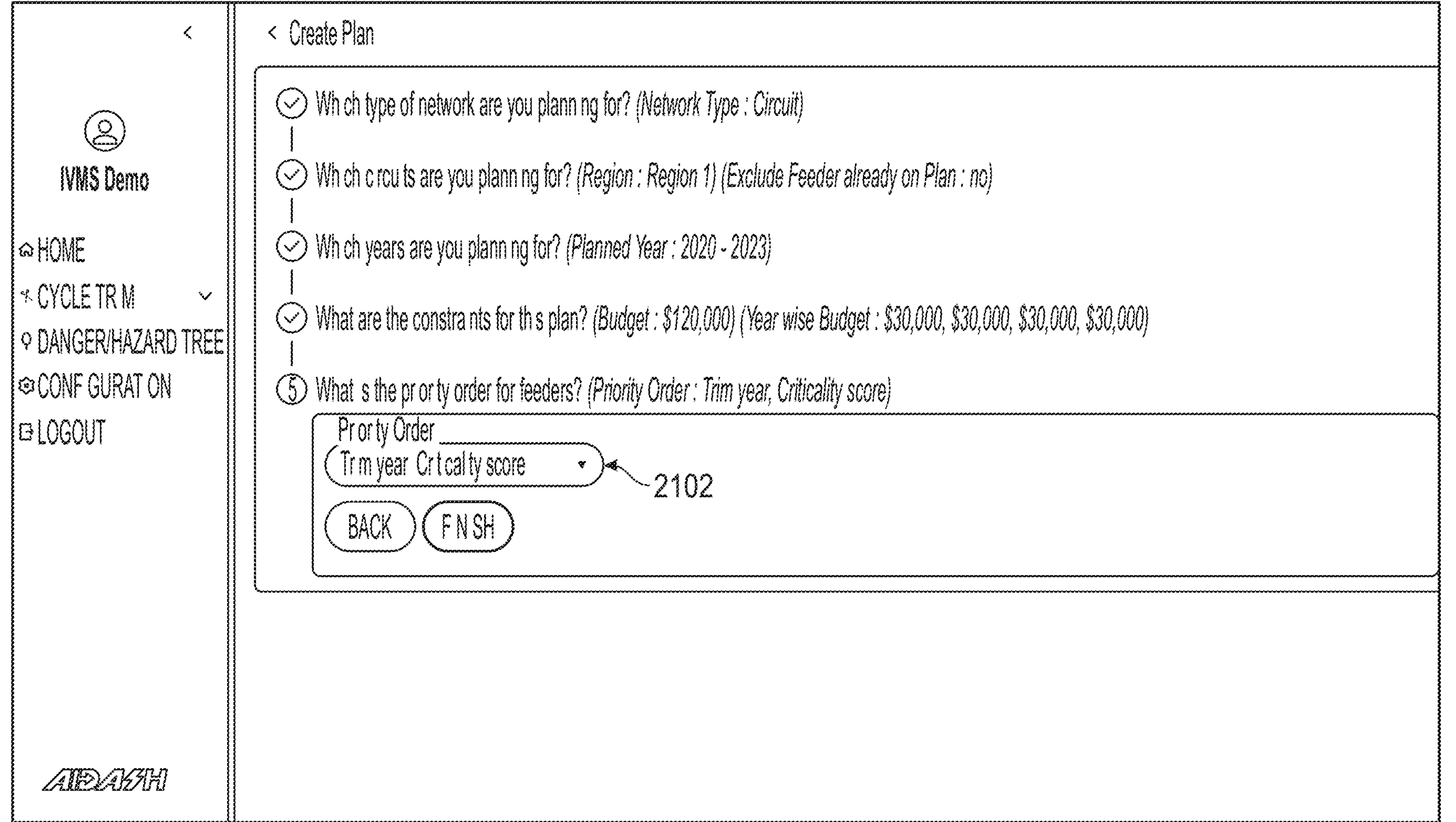
FIG. 21 is an example user interface depicting a fifth step of the creation of a trim cycle according to some embodiments.

FIG. 17 depicts a second step of the creation of the trim cycle. The user may limit the trim cycle to a particular region and/or sub-region. FIG. 18 depicts a third step of the creation of the trim cycle. The user may limit the trim cycle to a particular trim frame. FIG. 19 depicts a fourth step of the creation of the trim cycle, selecting a constraint type according to some embodiments. The user may choose the type of constraint to restrict the trim cycle by budget, power line length, or a total effort index. The total effect index may be calculated by the IVMS and may be based on the number of work hours to complete the work order, the number and type of equipment required to complete the work order, and the weather pattern of a geographic area of the work order. In FIG. 20, the user may interact with area 2002 of the user interface and input a year-wise budget for one or more years. FIG. 21 depicts a fifth step of the creation of a work order plan. The user may interact with a pull-down menu in area 2102 to choose a criterion to order work orders in the trim cycle. The trim cycle may sort work orders by a variety of criteria and group work orders by a time frame in which the work order needs to be completed.

Figure 23:
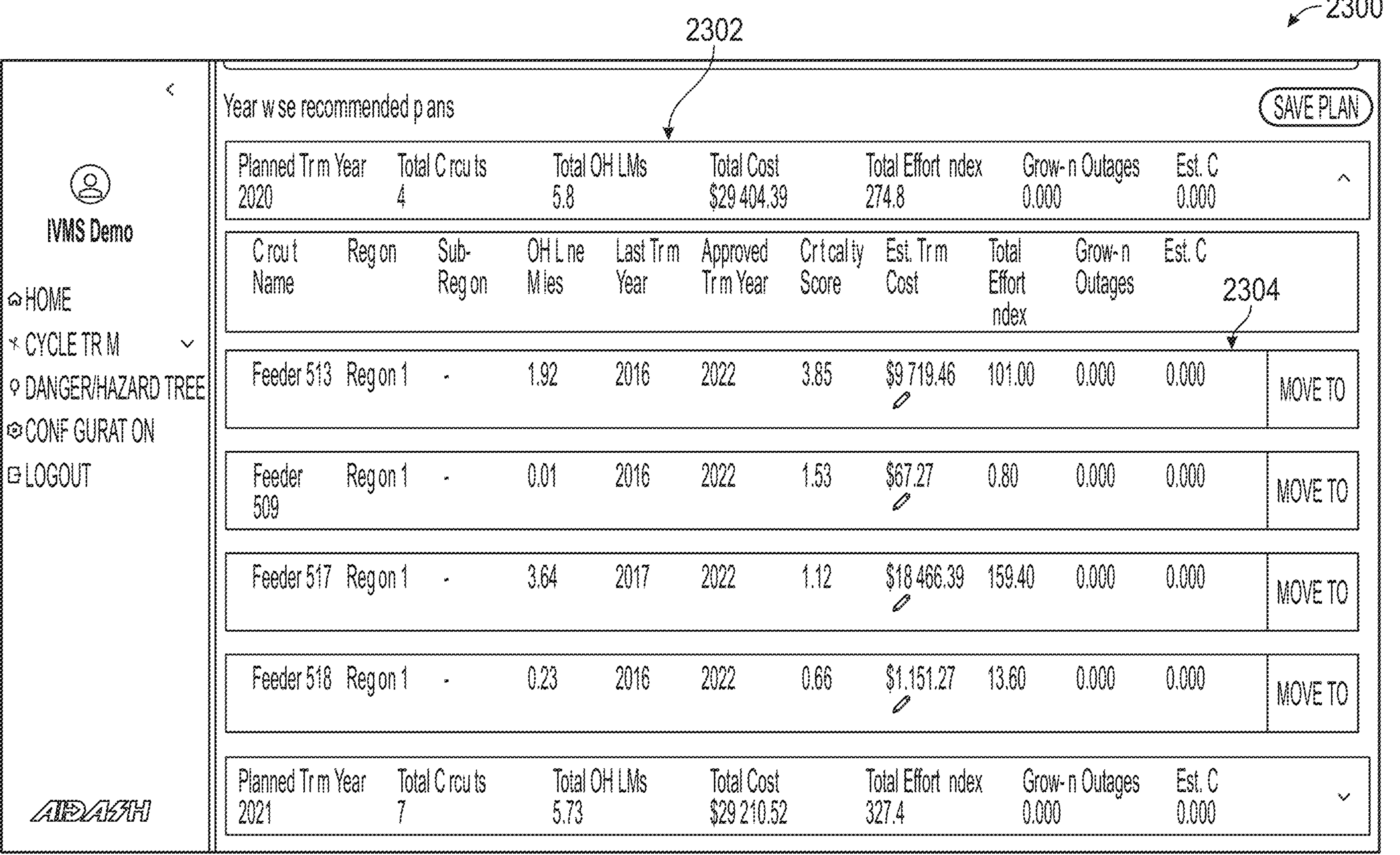
FIG. 23 is an example user interface depicting details regarding work orders according to some embodiments.

FIG. 22 is an example user interface 2200 depicting year-wise recommended plans according to some embodiments. The user interface 2200 may be the result of the creation of the trim cycle as depicted in FIG. 16 through 21. Row 2202 summarizes work orders that are planned using the criteria submitted by a user in the creation of the trim cycle. Row 2202 may include a number of circuits affected by work orders planned during a particular year of the trim cycle, as well as an estimated total cost and total effort index. The user may interact with row 2202 and be provided the work orders which make up the FIG. 23 is an example user interface 2300 depicting details regarding work orders which make up a particular year of the trim cycle according to some embodiments. The user interface 2300 includes row 2302, which summarizes the number of work orders planned for that particular year using the criteria submitted by the user as depicted in FIG. 16 through 21. Row 2304 depicts one of four work orders planned for the particular year. Each row may include further details of the work order, including the length of the span of the work order, criticality score, and total effort index.

The invention claimed is:

1. A non-transitory computer-readable medium comprising executable instructions, the executable instructions being executable by one or more processors to perform a method, the method comprising:

receiving a first set of images of a first geographic area that is included in a first geographic region and a second set of images of a second geographic area that is included in a second geographic region, the first geographic region different from the second geographic region, the first set of images captured from above the first geographic area and the second set of images captured from above the second geographic area, the first geographic area including one or more first assets of an infrastructure and the second geographic area including one or more second assets of the infrastructure, each of the one or more first assets and each of the one or more second assets being one of a plurality of electrical assets of the infrastructure, the one or more first assets being of a first asset type, the one or more second assets being of a second asset type;

identifying the one or more first assets in the first set of images and the one or more second assets in the second set of images;

determining a first classification for the first geographic region and a second classification for the second geographic region, the first classification different from the second classification;

determining one or more first zones for the one or more first assets based on the first classification for the first geographic region;

determining one or more second zones for the one or more second assets based on the second classification for the second geographic region;

identifying vegetation in the first set of images and the second set of images;

for at least one first asset:

determining, using a first image of the first set of images, a first distance between vegetation and a first zone of the one or more first zones;

generating a first criticality score based on the first distance;

determining that the first criticality score exceeds a first threshold; and providing a first alert of a first hazardous condition for the at least one first asset; and for at least one second asset:

determining, using a second image of the second set of images, a second distance between vegetation and a second zone of the one or more second zones;

generating a second criticality score based on the second distance;

determining that the second criticality score exceeds a second threshold; and providing a second alert of a second hazardous condition for the at least one second asset.

2. The non-transitory computer-readable medium of claim 1, wherein the method further comprises providing for display a user interface that includes at least a first portion of the first geographic area and at least one first asset of the one or more first assets, or at least a second portion of the second geographic area and at least one second asset of the one or more second assets.

3. The non-transitory computer-readable medium of claim 2, wherein the at least one first asset of the one or more first assets is colored based on the first criticality score and the at least one second asset of the one or more second assets is colored based on the second criticality score.

4. The non-transitory computer-readable medium of claim 1, wherein the first classification for the first geographic region is based on first terrain of the first geographic region and the second classification for the second geographic region is based on second terrain of the second geographic region.

5. The non-transitory computer-readable medium of claim 1, wherein the method further comprises receiving first location information for the one or more first assets and second location information for the one or more second assets, and wherein identifying the one or more first assets in the first set of images and the one or more second assets in the second set of images includes identifying the one or more first assets in the first set of images based on the first location information and the one or more second assets in the second set of images based on the second location information.

6. The non-transitory computer-readable medium of claim 1, wherein the method further comprises generating a trim plan for vegetation proximate to the at least one first asset and one or more other first assets.

7. The non-transitory computer-readable medium of claim 6, wherein the method further comprises receiving a time when the vegetation proximate to the at least one first asset and the one or more other first assets was last trimmed, and wherein generating the trim plan for the vegetation includes generating the trim plan for the vegetation based on the time when the vegetation was last trimmed.

8. The non-transitory computer-readable medium of claim 1, wherein the first threshold is based on a first growth rate of vegetation and the second threshold is based on a second growth rate of vegetation.

9. The non-transitory computer-readable medium of claim 1, wherein the first threshold is based on a first criticality factor for the at least one first asset and the second threshold is based on a second criticality factor for the at least one second asset.

10. The non-transitory computer-readable medium of claim 1 wherein determining the one or more first zones for the one or more first assets based on the first classification includes determining multiple concentric first zones for the at least one first asset based on the first classification, the multiple concentric first zones encompassing the at least one first asset.

11. The non-transitory computer-readable medium of claim 1 wherein determining the one or more first zones for the one or more first assets based on the first classification includes determining the one or more first zones for the one or more first assets based on one or more first zone rules that determine one or more shapes of the one or more first zones.

12. A method comprising:

receiving a first set of images of a first geographic area that is included in a first geographic region and a second set of images of a second geographic area that is included in a second geographic region, the first geographic region different from the second geographic region, the first set of images captured from above the first geographic area and the second set of images captured from above the second geographic area, the first geographic area including one or more first assets of an infrastructure and the second geographic area including one or more second assets of the infrastructure, each of the one or more first assets and each of the one or more second assets being one of a plurality of electrical assets of the infrastructure, the one or more first assets being of a first asset type, the one or more second assets being of a second asset type;

identifying the one or more first assets in the first set of images and the one or more second assets in the second set of images;

determining a first classification for the first geographic region and a second classification for the second geographic region, the first classification the first classification different from the second classification;

determining one or more first zones for the one or more first assets based on the first classification for the first geographic region;

determining one or more second zones for the one or more second assets based on the second classification for the second geographic region;

identifying vegetation in the first set of images and the second set of images;

for at least one first asset:

determining, using a first image of the first set of images, a first distance between vegetation and a first zone of the one or more first zones;

generating a first criticality score based on the first distance;

determining that the first criticality score exceeds a first threshold; and providing a first alert of a first hazardous condition for the at least one first asset; and for at least one second asset:

determining, using a second image of the second set of images, a second distance between vegetation and a second zone of the one or more second zones;

generating a second criticality score based on the second distance;

determining that the second criticality score exceeds a second threshold; and providing a second alert of a second hazardous condition for the at least one second asset.

13. The method of claim 12, further comprising providing for display a user interface that includes at least a first portion of the first geographic area and at least one first asset of the one or more first assets, or at least a second portion of the second geographic area and at least one second asset of the one or more second assets.

14. The method of claim 12, wherein the at least one first asset of the one or more first assets is colored based on the first criticality score and the at least one second asset of the one or more second assets is colored based on the second criticality score.

15. The method of claim 12, wherein the first classification for the first geographic region is based on first terrain of the first geographic region and the second classification for the second geographic region is based on second terrain of the second geographic region.

16. The method of claim 12, further comprising receiving first location information for the one or more first assets and second location information for the one or more second assets, and wherein identifying the one or more first assets in the first set of images and the one or more second assets in the second set of images includes identifying the one or more first assets in the first set of images based on the first location information and the one or more second assets in the second set of images based on the second location information.

17. The method of claim 12, further comprising generating a trim plan for vegetation proximate to the at least one first asset and one or more other first assets.

18. The method of claim 17, further comprising receiving a time when the vegetation proximate to the at least one first asset and the one or more other first assets was last trimmed, and wherein generating the trim plan for the vegetation includes generating the trim plan for the vegetation based on the time when the vegetation was last trimmed.

19. The method of claim 12, wherein the first threshold is based on a first growth rate of vegetation and the second threshold is based on a second growth rate of vegetation.

20. A system comprising at least one processor and memory containing executable instructions, the executable instructions being executable by the at least one processor to:

receive a first set of images of a first geographic area that is included in a first geographic region and a second set of images of a second geographic area that is included in a second geographic region, the first geographic region different from the second geographic region, the first set of images captured from above the first geographic area and the second set of images captured from above the second geographic area, the first geographic area including one or more first assets of an infrastructure and the second geographic area including one or more second assets of the infrastructure, each of the one or more first assets and each of the one or more second assets being one of a plurality of electrical assets of the infrastructure, the one or more first assets being of a first asset type, the one or more second assets being of a second asset type;

identify the one or more first assets in the first set of images and the one or more second assets in the second set of images;

determine a first classification for the first geographic region and a second classification for the second geographic region, the first classification different from the second classification;

determine one or more first zones for the one or more first assets based on the first classification for the first geographic region;

determine one or more second zones for the one or more second assets based on the second classification for the second geographic region;

identify vegetation in the first set of images and the second set of images;

for at least one first asset:

determine, using a first image of the first set of images, a first distance between vegetation and a first zone of the one or more first zones;

generate a first criticality score based on the first distance;

determine that the first criticality score exceeds a first threshold; and provide a first alert of a first hazardous condition for the at least one first asset; and for at least one second asset:

determine, using a second image of the second set of images, a second distance between vegetation and a second zone of the one or more second zones;

generate a second criticality score based on the second distance;

determine that the second criticality score exceeds a second threshold; and provide a second alert of a second hazardous condition for the at least one second asset.

* * * * *